(12) United States Patent
Zhu et al.

(10) Patent No.: US 12,176,775 B2
(45) Date of Patent: Dec. 24, 2024

(54) STATOR WINDING STRUCTURE AND MOTOR COMPRISING SAME

(71) Applicant: SAIC MOTOR CORPORATION LIMITED, Shanghai (CN)

(72) Inventors: Jun Zhu, Shanghai (CN); Jian Wang, Shanghai (CN); ShaoRui Huang, Shanghai (CN); JieBao Li, Shanghai (CN); HaoChun Li, Shanghai (CN); YuanLiang Min, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 298 days.

(21) Appl. No.: 17/778,643

(22) PCT Filed: Dec. 31, 2019

(86) PCT No.: PCT/CN2019/130273
§ 371 (c)(1),
(2) Date: May 20, 2022

(87) PCT Pub. No.: WO2021/134387
PCT Pub. Date: Jul. 8, 2021

(65) Prior Publication Data
US 2022/0407378 A1    Dec. 22, 2022

(51) Int. Cl.
*H02K 3/28* (2006.01)
*H02K 3/50* (2006.01)

(52) U.S. Cl.
CPC ............ *H02K 3/28* (2013.01); *H02K 3/50* (2013.01); *H02K 2203/09* (2013.01)

(58) Field of Classification Search
CPC ....................................................... H02K 3/28
USPC ...................................................... 310/208
See application file for complete search history.

(56) References Cited

U.S. PATENT DOCUMENTS

| | | | | |
|---|---|---|---|---|
| 6,285,105 | B1* | 9/2001 | Asao | H02K 3/28 310/201 |
| 6,455,972 | B1* | 9/2002 | Asao | H02K 3/345 310/184 |
| 6,862,797 | B2* | 3/2005 | Neet | H02K 3/12 29/598 |

(Continued)

FOREIGN PATENT DOCUMENTS

| | | |
|---|---|---|
| CN | 103280906 A | 9/2013 |
| CN | 207320983 U | 5/2018 |

(Continued)

OTHER PUBLICATIONS

CN Office Action and Search Report for Application No. 201911407267.1, mailed Nov. 29, 2021.
PCT International Search Report in International Application No. PCT/CN2019/130273, mailed Jul. 28, 2020.
JP Office Action for Application No. 2022-526441, mailed May 9, 2023 (with machine translation) 10 pp.

(Continued)

*Primary Examiner* — Alexander Talpalatski
(74) *Attorney, Agent, or Firm* — NIXON PEABODY LLP

(57) ABSTRACT

A stator winding structure (100) for a motor. The motor is a three-phase alternating current motor having eight poles. Each phase comprises four shunt wound branches. The stator winding consists of multiple U-shaped flat copper wires (10). A connection portion of each U-shaped flat copper wire (10) disposed in the motor is located on the same side with respect to the motor. The technical solution also provides a motor comprising the stator winding structure (100) and a vehicle comprising the motor.

20 Claims, 29 Drawing Sheets

(56) References Cited

U.S. PATENT DOCUMENTS

| | | | |
|---|---|---|---|
| 8,179,013 B2* | 5/2012 | Ishizuka | H02K 3/12 |
| | | | 310/207 |
| 9,847,686 B2 | 12/2017 | Tamura | |
| 2012/0146447 A1 | 6/2012 | Seguchi et al. | |
| 2014/0125187 A1 | 5/2014 | Suzuki et al. | |
| 2014/0285056 A1* | 9/2014 | Tomohara | H02K 15/045 |
| | | | 29/596 |
| 2014/0333172 A1* | 11/2014 | Onishi | H02K 3/12 |
| | | | 29/596 |
| 2015/0076953 A1* | 3/2015 | Tamura | H02K 3/28 |
| | | | 310/208 |
| 2015/0091408 A1* | 4/2015 | Azusawa | H02K 3/12 |
| | | | 310/208 |
| 2015/0097453 A1 | 4/2015 | Nishikawa et al. | |
| 2017/0033619 A1 | 2/2017 | Tamura | |
| 2017/0256996 A1 | 9/2017 | Nakamura et al. | |
| 2019/0363663 A1 | 11/2019 | Hirotani et al. | |

FOREIGN PATENT DOCUMENTS

| | | |
|---|---|---|
| CN | 109586459 A | 4/2019 |
| CN | 209233596 U | 8/2019 |
| CN | 110417152 A | 11/2019 |
| CN | 110611387 A | 12/2019 |
| JP | 2012-130093 A | 7/2012 |
| JP | 2013-128362 A | 6/2013 |
| JP | 2014-096857 A | 5/2014 |
| JP | 2015023672 A | 2/2015 |
| JP | 2015-076905 A | 4/2015 |
| JP | 2015-084635 A | 4/2015 |
| WO | 2017149935 A1 | 9/2017 |

OTHER PUBLICATIONS

European search report for Application No. 19958441.8, mailed Aug. 8, 2023.

* cited by examiner

12

12

12

12

STATOR WINDING STRUCTURE AND MOTOR COMPRISING SAME

CROSS-REFERENCE TO RELATED APPLICATIONS

This application is the United States National Phase of International Application No.: PCT/CN2019/130273, filed Dec. 31, 2019, the entire contents of which are herein incorporated by reference in their entirety.

TECHNICAL FIELD

The present application relates to a stator winding structure and a motor including such a stator winding structure, specifically to a stator winding structure with flat wire construction. The motor including such a stator winding can be used as a drive motor or a generator for a new energy vehicle, etc.

BACKGROUND

A motor, such as an AC motor, includes a stator assembly and a rotor assembly. The stator assembly usually includes a stator winding and a stator core. The stator winding provides electrical energy input and magnetic field establishment for motor, while the stator core provides magnetic load path for motor.

In order to improve power density, heat dissipation and structural stability, the motors used in new energy vehicles often use hairpin-typed flat-wire windings, greatly increasing the slot fill rate of the stators and improving motor power density.

Flat wire windings can be adopted with different strategies or ways. In the prior art, multi-layer flat copper wire wave windings are usually used to reduce AC copper consumption in motors.

For multi-layer windings (8 layers and above), parallel winding with multiple branches in one phase is often used to match the torque and voltage characteristics of the motor. In an example of 4 parallel-winding branches with 8-layer flat copper wire, for the U-phase winding, the first parallel-winding branch is formed by connecting the first and second conductors in the corresponding slots, the second parallel-winding branch is formed by connecting the third and fourth conductors in the corresponding slots, the third parallel-winding branch is formed by connecting the fifth and sixth conductors in the corresponding slots, and the fourth parallel-winding branch is formed by connecting the seventh and eighth conductors in the corresponding slots. The above-mentioned four parallel-winding branches are connected head-to-head forming the head end of the U-phase winding and tail-to-tail forming the tail end of the U-phase winding. The U-phase is connected to the V and W phases respectively forming a Y-type three-phase winding or a delta-type three-phase winding.

Although desired torque and power can be achieved by the above-mentioned way, an unbalanced current loop between the parallel-winding branches of the same phase will be generated due to unequal electromagnetic coupling, which will cause further copper consumption and torque fluctuation and bring considerable negative impact to motor performances.

Therefore, there is an urgent need to provide a stator winding structure and a motor including a stator winding structure which can be more advantageous in at least one aspect compared to the prior art.

SUMMARY

For the widely used 8-pole multilayer (8 layers and above) flat copper wire winding generating electrical current loop due to uneven electromagnetic coupling caused by magnetic leakage, the present invention proposes a 4-branch parallel winding structure.

Specifically, in one aspect, the present application provides a stator winding structure for a motor, the motor being a three-phase AC motor having eight poles, comprising phases U, V and W; wherein each phase comprises four parallel-winding branches: a first parallel-winding branch, a second parallel-winding branch, a third parallel-winding branch and a fourth parallel-winding branch, each parallel-winding branch having a head end and a tail end, the winding directions of the first and third parallel-winding branches being the same, and the winding directions of the second and fourth parallel-winding branches being the same and opposite to the winding directions of the first and third parallel-winding branches, the three-phase AC motor being capable of normal operation when being energized, the stator winding structure being arranged on the stator core, the stator core comprising a plurality of slots, the stator winding comprising a plurality of U-shaped flat copper wires, wherein each U-shaped flat copper wire comprises: a first conductor, a second conductor substantially parallel to the first conductor, and a connecting part connecting the first conductor and the second conductor; wherein the connecting part of each U-shaped flat copper wire arranged in the motor is located on the same side relative to the motor, wherein Q represents the number of slots of the stator core, the slots being numbered clockwise or counter-clockwise; i represents a natural number satisfying $1 \leq i \leq Q$; q represents the number of slots per pole per phase; $q=(Q/p)/3$ and $q=1, 2, 3 \ldots$ and so on; L represents the number of layers of each slot, and where L is an even number and $L=8+4*1$, where $1=0, 1, 2, 3 \ldots$, and j is a natural number satisfying $1 \leq j \leq L$, and y represents the pitch; one layer in one slot corresponding to one conductor; and wherein as seen from the side of the connecting part, two conductors of the U-shaped flat copper wire are connected as:

conductor of layer j in slot i being connected to conductor of layer j+1 in slot i+y in the case that j is odd and $j=1, 3, 5 \ldots L-1$, conductor of layer j in slot i being connected to conductor of layer j−1 in slot i−y in the case that j is even and $j=2, 4, 6 \ldots L$, as seen from the solder end of the motor, two conductors being soldered or joined with deflector to form a three-phase AC motor are connected as:

conductor of layer j in slot i being connected to conductor of layer j+1 or j−1 in slot i+y in the case that $j=2, 4, 6 \ldots L-2$;

conductor of layer j in slot i being connected to conductor of layer j+1 or j−1 in slot i−y in the case that $j=3, 5 \ldots L-1$;

conductor of layer j in slot i being connected to conductor of layer j−1 in slot i+y or to layer 1 in slot i+y+1 or i+y−1 in the case that j=L, conductor of layer j in slot i being connected to conductor of layer j+1 in slot i−y or to layer L in slot i−y+1 or i−y−1 in the case that j=1, where the value of i is a function of the phase of the winding and the branch number, and where i−y=i−y+Q when i−y<0 and i+y=i+y−Q when i+y>Q.

In a further aspect, the present application provides a stator winding structure for a motor, the motor being a three-phase AC motor having eight poles, comprising phases U, V and W; wherein each phase comprises four parallel-winding branches: a first parallel-winding branch, a second parallel-winding branch, a third parallel-winding branch and a fourth parallel-winding branch, each parallel-winding branch having a head end and a tail end, the winding directions of the first and third parallel-winding branches being the same, and the winding directions of the second and fourth parallel-winding branches being the same and both opposite to the winding directions of the first and third parallel-winding branches, the three-phase AC motor being capable of normal operation when being energized, the stator winding structure being arranged on the stator core, the stator core comprising a plurality of slots, the stator winding comprising a plurality of U-shaped flat copper wires, wherein each U-shaped flat copper wire comprises: a first conductor, a second conductor substantially parallel to the first conductor, and a connecting part connecting the first conductor and the second conductor; wherein the connecting part of each U-shaped flat copper wire arranged in the motor is located on the same side relative to the motor, wherein Q represents the number of slots of the stator core, the slots being numbered clockwise or counter-clockwise; i represents a natural number satisfying 1≤i≤Q; q represents the number of slots per pole per phase; q=(Q/p)/3 and q=1, 2, 3 . . . and so on; L represents the number of layers of each slot, where L is an even number and L=8+4*1, where 1=0, 1, 2, 3 . . . , j is a natural number satisfying 1≤j≤L; and y represents the pitch; one layer in one slot corresponding to one conductor, as seen from the side of the solder end, two conductors being soldered together to form a three-phase AC motor with 8 poles and including four parallel-winding branches per phase are connected as:

conductor of layer j in slot i being connected to conductor of layer j+1 in slot i+y in the case that j is odd and j=1, 3, 5 . . . L−1, conductor of layer j in slot i being connected to conductor of layer j−1 in slot i−y in the case that j is even and j=2, 4, 6 . . . L, as seen from the side of the motor with the connecting part, two conductors are connected with deflector or connecting part as:

conductor of layer j in slot i being connected to conductor of layer j+1 or j−1 in slot i+y in the case that j=2, 4, 6 . . . L−2, conductor of layer j in slot i being connected to conductor of layer j+1 or j−1 in slot i−y in the case that j=3, 5 . . . L−1, conductor of layer j in slot i being connected to conductor of layer j−1 in slot i+y or to conductor of layer 1 in slot i+y+1 or i+y−1 in the case that j=L, conductor of layer j in slot i being connected to conductor of layer j+1 in slot i−y or to layer L in slot i−y+1 or i−y−1 in the case that j=1, where the value of i is a function of the phase of the winding and the branch number and where i−y=i−y+Q when i−y<0 and i+y=i+y−Q when i+y>Q.

Optionally, each of the conductors of the first parallel-winding branch and the third parallel-winding branch at head ends is located in an odd layer of slot i±2ky, respectively, where k=0, 1, 2, 3 . . . and so on; and wherein each of the conductors of the second parallel-winding branch and the fourth parallel-winding branch at head ends is located in an even layer of stator i±2ky, where k=0, 1, 2, 3 . . . and so on.

Optionally, the head and tail ends of the first parallel-winding branch, the second parallel-winding branch, the third parallel-winding branch and the fourth parallel-winding branch are located in layer 1 or layer L.

Optionally, the head ends of two of the four parallel-winding branches are located in layer 1 and layer L of slot i respectively; and the head ends of the other two of the four parallel-winding branches are located in layer 1 and layer L of slot i+Q/2, respectively.

Optionally, the stator winding structure is configured as a Y-type winding structure connected in a tail-to-tail manner or a delta-type winding structure connected in a head-to-tail manner.

Optionally, the stator winding structure is a full pitch winding structure, a short pitch winding structure or a long pitch winding structure.

In a further aspect, the present application provides a motor comprising a stator winding structure according to the above.

Optionally, the motor includes 48 stator slots, each stator slot having 8 layers.

Optionally, phase U comprises four parallel-winding branches: a first parallel-winding branch of phase U, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i.j" denoting layer j in slot i; and wherein the first parallel-winding branch of phase U is connected as:

1.1^7.2-13.1^19.2-25.3^31.4-37.3^43.4-1.5^7.6-13.5^19.6-25.7^31.8-37.7^43.8↔2.1^8.2-14.1^20.2-26.3^32.4-38.3^44.4-2.5^8.6-14.5^20.6-26.7^32.8-38.7^44.8;

the second parallel-winding branch of phase U is connected as:

1.8^43.7-37.8^31.7-25.6^19.5-13.6^7.5-1.4^43.3-37.4^31.3-25.2^19.1-13.2 ^7.1↔2.8^44.7-38.8^32.7-26.6^20.5-14.6^8.5-2.4^44.3-38.4^32.3-26.2^20.1-14.2^8.1;

the third parallel-winding branch of phase U is connected as:

25.1^31.2-37.1^43.2-1.3^7.4-13.3^19.4-25.5^31.6-37.5^43.6-1.7^7.8-13.7^19.8↔26.1^32.2-38.1^44.2-2.3^8.4-14.3^20.4-26.5^32.6-38.5^44.6-2.7^8.8-14.7^20.8;

the fourth parallel-winding branch of phase U is connected as:

25.8^19.7-13.8^7.7-1.6^43.5-37.6^31.5-25.4^19.3-13.4^7.3-1.2^43.1-37.2^31.1↔26.8^20.7-14.8^8.7-2.6^44.5-38.6^32.5-26.4^20.3-14.4^8.3-2.2^44.1-38.2^32.1.

Optionally, phase U comprises four parallel-winding branches: a first parallel-winding branch of phase U, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i.j" denoting layer j in slot i; and wherein the first parallel-winding branch of phase U is connected as:

13.1^19.2-25.3^31.4-37.3^43.4-1.5^7.6-13.5^19.6-25.7^31.8-37.7^43.8↔2.1^8.2-14.1^20.2-26.3^32.4-38.3^44.4-2.5^8.6-14.5^20.6-26.7^32.8-38.7^44.8 ↔1.1^7.2;

the second parallel-winding branch of phase U is connected as:

1.8^43.7-37.8^31.7-25.6^19.5-13.6^7.5-1.4^43.3-37.4^31.3-25.2^19.1-13.2  ^7.1↔2.8^44.7-38.8^32.7-26.6^20.5-14.6^8.5-2.4^44.3-38.4^32.3-26.2^20.1-14.2^8.1;

the third parallel-winding branch of phase U is connected as:

13.3^19.4-25.5^31.6-37.5^43.6-1.7^7.8-13.7^19.8↔26.1^32.2-38.1^44.2-2.3^8.4-14.3^20.4-26.5^32.6-38.5^44.6-2.7^8.8-14.7^20.8↔25.1^31.2-37.1^43.2-1.3^7.4;

the fourth parallel-winding branch of phase U is connected as:

1.6^43.5-37.6^31.5-25.4^19.3-13.4^7.3-1.2^43.1-37.2^31.1↔26.8^20.7-14.8^8.7-2.6^44.5-38.6^32.5-26.4^20.3-14.4^8.3-2.2^44.1-38.2^32.1↔25.8^19.7-13.8^7.7.

Optionally, phase U comprises four parallel-winding branches: a first parallel-winding branch of U phase, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i.j" denoting layer j in slot i; and wherein the first parallel-winding branch of phase U is connected as:

8.1-14.2^20.1-26.2^32.3-38.4^44.3-2.4^8.5-14.6^20.5-26.6^32.7-38.8^44.7-2.8↔7.1-13.2^19.1-25.2^31.3-37.4^43.3-1.4^7.5-13.6^19.5-25.6^31.7-37.8^43.7-1.8;

the second parallel-winding branch of phase U is connected as:

44.8-38.7^32.8-26.7^20.6-14.5^8.6-2.5^44.4-38.3^32.4-26.3^20.2-14.1^8.2-2.1↔3.8-37.7^31.8-25.7^19.6-13.5^7.6-1.5^43.4-37.3^31.4-25.3^19.2-13.1^7.2-1.1;

the third parallel-winding branch of phase U is connected as:

32.1-38.2^44.1-2.2^8.3-14.4^20.3-26.4^32.5-38.6^44.5-2.6^8.7-14.8^20.7-26.8↔31.1-37.2^43.1-1.2^7.3-13.4^19.3-25.4^31.5-37.6^43.5-1.6^7.7-13.8^19.7-25.8;

the fourth parallel-winding branch of phase U is connected as:

20.8-14.7^8.8-2.7^44.6-38.5^32.6-26.5^20.4-14.3^8.4-2.3^44.2-38.1^32.2-26.1↔19.8-13.7^7.8-1.7^43.6-37.5^31.6-25.5^19.4-13.3^7.4-1.3^43.2-37.1^31.2-25.1.

In a further aspect, the present application provides a vehicle comprising a motor according to the above.

Both of the stator winding structure and the motor including the stator winding structure provided in this application are able to achieve the purpose of weakening and reducing electrical current loop, reducing additional copper consumption caused by the electrical current loop, and improving motor performance, etc.

In addition, the winding structure and the motor including the stator winding structure claimed to be protected by this application enable conductors of the same branch circuit to be distributed in the circumferential direction in each conductor layer of the stator slot. With connecting conductors located at different radius positions in the stator slot to each other, it is possible to achieve at least one of the following purposes: improving heat dissipation capacity of conductors in the stator slot away from the coolant, balancing temperature difference between layers of conductors, increasing continuous power and power density of the motor, reducing heat radiation from stators to rotors, controlling rotor temperature, and reducing end size of armature to some extent.

DETAILED DESCRIPTION

Some possible embodiments of the present application are described below with reference to the accompanying drawings. It should be noted that the figures are not drawn to scale. Some details may have been enlarged for clarity, and some details not necessary to be shown have been omitted.

A motor includes a stator and a rotor (not shown). The stator includes a stator core 11 and a stator winding structure 100. The stator core 11 has a plurality of slots circumferentially distributed.

Figure 1:
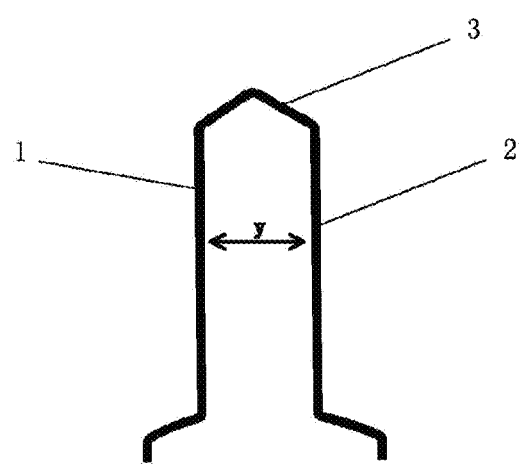
FIG. 1 illustrates a schematic diagram of a U-shaped flat copper wire according to an embodiment of the present application.

The stator winding structure 100 may comprise a plurality of U-shaped flat copper wires 10 shown in FIG. 1. The U-shaped flat copper wire 10 has a pitch of y.

The U-shaped flat copper wire 10 comprises: a first conductor 1 and a second conductor 2 and a connecting part 3. In the orientation shown in FIG. 1, the first conductor 1 is at the left side and the second conductor 2 is at the right side. With the connecting part 3, the first conductor 1 is connected to the second conductor 2.

In the present application, the end with the connecting part 3 is the U-shaped end (top of FIG. 1) and the opposite end (without the connecting part) is the solder end (bottom of FIG. 1).

In this disclosure, the stator winding structure 100 of the stator comprises a three-phase (U, V and W phases) winding structure with a phase difference of 120° electrical angle, and the stator winding structure 100 is arranged in the slots of the stator core 11.

Each phase of the three-phase winding comprises four parallel-winding branches wound on the core 11: a first parallel-winding branch, a second parallel-winding branch, a third parallel-winding branch and a fourth parallel-winding branch. The first and third parallel-winding branches have the same winding direction, and the second and fourth parallel-winding branches have the same winding direction and are both opposite to the winding direction of the first and third parallel-winding branches. The three-phase AC motor is able to operate normally when energized.

Figure 2:
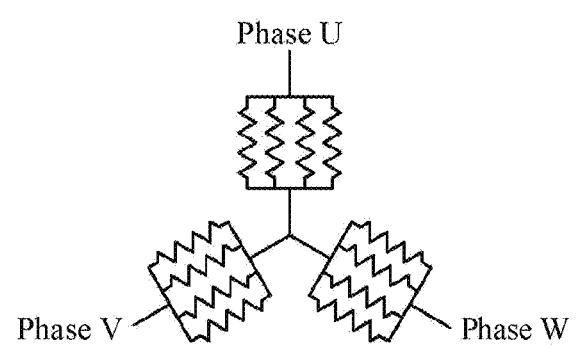
FIG. 2 illustrates a circuit diagram of a stator winding according to an embodiment of the present application, wherein each of the U, V and W phases includes four parallel-winding branches.

According to different needs, the three-phase winding may be formed as a Y-type winding with tail-to-tail connection or as a delta-type winding with head-to-tail connection. In the disclosure of this application, the Y-type winding connection is used for illustrative reasons (as shown in FIG. 2), but the scope of protection of this application also includes delta-type windings.

The slot number of the motor is represented as Q. As may be known, the start of slots can be any slot and the number can be incremented clockwise or counterclockwise. The number of pairs of pole is represented as P (number of poles is represented as p, and p=2*P=8), the pole pitch represented as $\tau$ and $\tau=Q/p$, the pitch of the full pitch winding represented as y, and y=$\tau$. Each phase of the winding structure includes a plurality of in-slot conductors that are all inserted into the slots of the stator core 11. In each slot of the stator core 11, there are arranged L (L represents the number of layers) layers for conductor sections, where L is an even number and L=8+4*1 (1=0, 1, 2, 3 . . . and so on (1 is a natural number)). q represents the number of slots per pole per phase, where q=(Q/p)/3 and q=1, 2, 3 . . . and so on (that is to say, q is a natural number started from 1).

According to an embodiment of the present application, the connecting part 3 (U-shaped end) of each of the plurality of U-shaped flat copper wires 10 constituting the stator winding structure 100 is at the first side of the motor. Similarly, the solder end of each of the plurality of U-shaped flat copper wires 10 constituting the stator winding structure 100 is at the second side of the motor, wherein the second side is opposite to the first side.

In one embodiment of the present application, as seen from the side of the connecting part 3 (the first side), two conductors 1, 2 of the U-shaped flat copper wire are connected as:

conductor of layer j in slot i being connected to conductor of layer j+1 in slot i+y in the case that j is odd and j=1, 3, 5 . . . L–1, conductor of layer j in slot i being connected to conductor of layer j–1 in slot i–y in the case that j is even and j=2, 4, 6 . . . L.

where the value of i is a function of the phase of the winding and the branch number, and where i–y=i–y+Q when i–y<0 and i+y=i+y–Q when i+y>Q.

Accordingly, as seen from the solder end of the motor (the second side), two conductors being soldered or joined with deflector to form the three-phase AC motor are connected as:

conductor of layer j in slot i being connected to conductor of layer j+1 or j–1 in slot i+y in the case that j=2, 4, 6 . . . L–2;

conductor of layer j in slot i being connected to conductor of layer j+1 or j–1 in slot i–y in the case that j=3, 5 . . . L–1;

conductor of layer j in slot i being connected to conductor of layer j–1 in slot i+y or to layer 1 in slot i+y+1 or i+y–1 in the case that j=L, conductor of layer j in slot i being connected to conductor of layer j+1 in slot i–y or to layer L in slot i–y+1 or i–y–1 in the case that j=1, where the value of i is a function of the phase of the winding and the branch number, and where i–y=i–y+Q when i–y<0 and i+y=i+y–Q when i+y>Q.

Alternatively, in another embodiment of the present application, as seen from the side with the solder end (the second side), two conductors 1, 2 being soldered together to form a three-phase AC motor with a pole number of 8 and including four parallel-winding branches per phase are connected as conductor of layer j in slot i being connected to conductor of layer j+1 in slot i+y in the case that j is odd and j=1, 3, 5 . . . L–1.

conductor of layer j in slot i being connected to conductor of layer j–1 in slot i–y in the case that j is even and j=2, 4, 6 . . . L, where the value of i is a function of the phase of the winding and the branch number and where i–y=i–y+Q when i–y<0 and i+y=i+y–Q when i+y>Q.

Accordingly, as seen from the side of the motor with the connecting part (the first side), two conductors 1, 2 are connected with deflector or connecting part 3 as:

conductor of layer j in slot i being connected to conductor of layer j+1 or j–1 in slot i+y in the case that j=2, 4, 6 . . . L–2;

conductor of layer j in slot i being connected to conductor of layer j+1 or j–1 in slot i–y in the case that j=3, 5 . . . L–1;

conductor of layer j in slot i being connected to conductor of layer j–1 in slot i+y or to conductor of layer 1 in slot i+y+1 or i+y–1 in the case that j=L;

conductor of layer j in slot i being connected to conductor of layer j+1 in slot i–y or to layer L in slot i–y+1 or i–y–1 in the case that j=1, where the value of i is a function of the phase of the winding and the branch number and where i–y=i–y+Q when i–y<0 and i+y=i+y–Q when i+y>Q.

For the four parallel-winding branches included in each phase, each of the first conductors of the first and the third parallel-winding branches is located in an odd layer of an i±2ky stator slot (k=0, 1, 2, . . . ) respectively; each of the first conductors of the second and the fourth parallel-winding branches is located in in an even layer of an i±2ky stator slot (k=0, 1, 2, . . . ) respectively. Note that one layer in one slot corresponds to one conductor, as is known to those skilled in the art. The corresponding end positions can be deduced from the connection of the conductors as described above and are therefore not repeated.

Alternatively, each of the first ends of the second and the fourth parallel-winding branches is located in an odd layer of an i±2ky stator slot (k=0, 1, 2 . . . ) respectively; each of the first ends of the first and the third parallel-winding branches is located in an even layer of an i±2ky stator slot (k=0, 1, 2 . . . ) respectively. Note that, as known to those skilled in the art, one layer in one slot corresponds to one conductor. The corresponding end positions can be deduced from the connection of the conductors as described above and are therefore not repeated.

All wiring structures derived from the above are within the scope of protection of this application.

In one embodiment, the winding structure is configured such that all head and tail ends of the 4 parallel-winding branches are located in the first or $L_{th}$ layer of the stator slot. For example, the head ends of two of the four parallel-winding branches are located in layer 1 and layer L of the $i_{th}$ stator slot respectively; and accordingly, the tail ends of the two parallel-winding branches are located in layer L of stator slot i–y+1 and layer 1 of stator slot i+y+1, respectively; the head ends of the other two parallel-winding branches of the four parallel-winding branches are located in layer 1 and layer L of stator slot i+Q/2 respectively; and accordingly, the tail ends of the other two parallel-winding branches are located in layer L of stator slot i+Q/2–y+1 and layer 1 of stator slot i+Q/2+y+1, respectively.

Optionally, each parallel-winding branch for each phase of the winding structure may be viewed as consisting of secondary branches with the number of qL/2 connected in series.

In some embodiments, a deflector 12 may be used to connect respective conductors during constructing of the stator winding structure 100 disclosed in this application. The deflector 12 may be any suitable deflector known in the art.

For better understanding of the present invention, the following three examples are shown, taking as an example an 8-layer (numbered as layer 1 to 8, respectively) winding with 8 poles and 48 slots (numbered as slot 1 to 48, respectively). Of course, the scope of protection of the present invention is not limited to the three examples below.

Example I

In this example of a three-phase AC motor, a stator includes a stator core 11 and a stator winding structure 100. The stator core 11 has a plurality of slots distributed thereon circumferentially. The stator winding structure 100 consists of a plurality of U-shaped flat copper wires 10.

Figure 3:
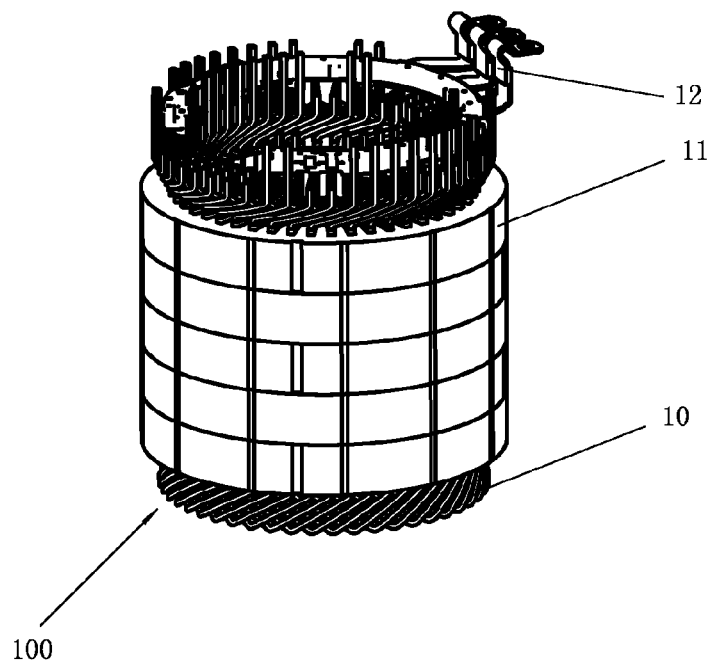
FIG. 3 illustrates a perspective view of a stator according to Example I of the present application, with solder ends being located on the top.
Figure 4:
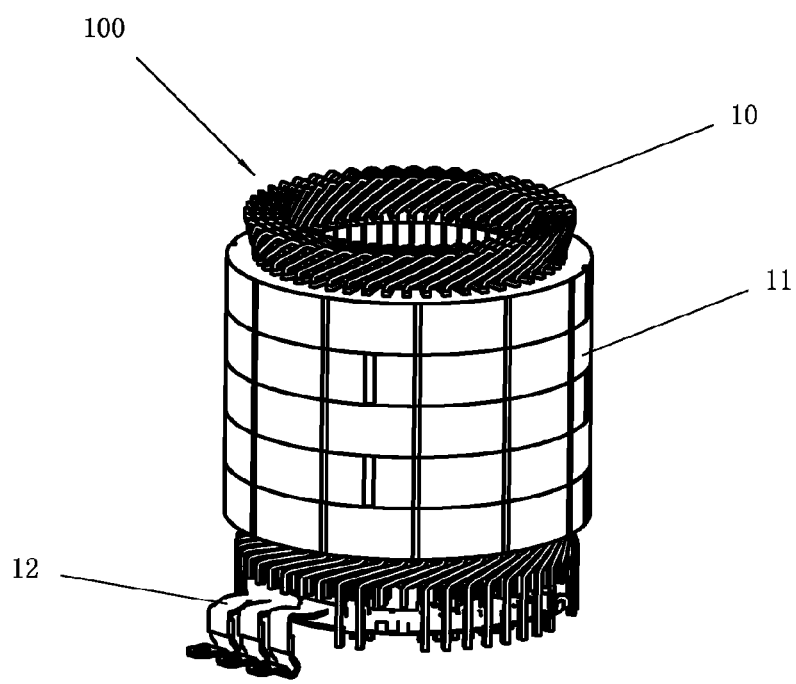
FIG. 4 illustrates a perspective view of the stator according to Example I of the present application, with U-shaped end being located on the top.
Figure 5:
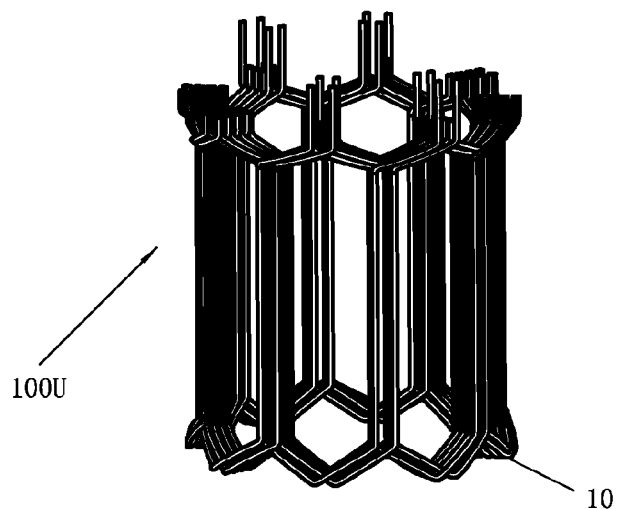
FIG. 5 illustrates a perspective view of the stator winding structure according to Example I of the present application, wherein only the U-phase winding is shown.
Figure 6:
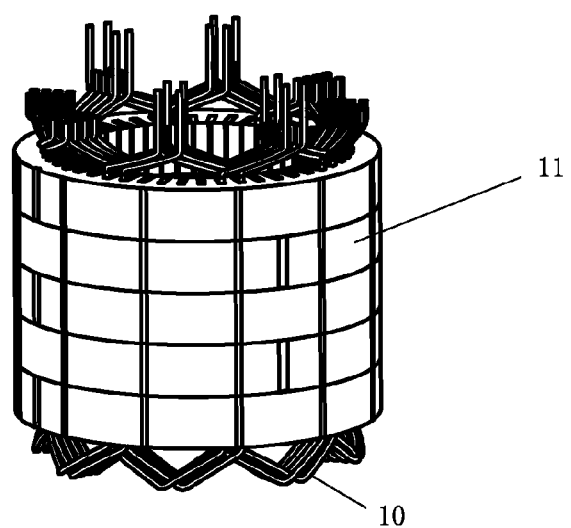
FIG. 6 illustrates a perspective view of the stator winding structure of FIG. 5, wherein the iron core is shown.
Figure 7A:
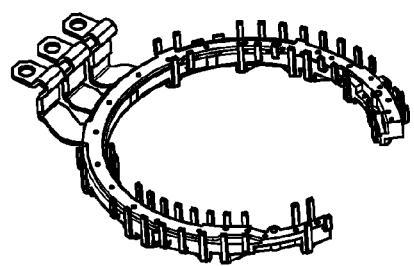
FIG. 7A illustrates a perspective view of the deflector for use in Example 1 of the present application.
Figure 7B:
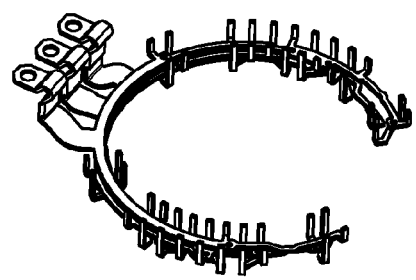
FIG. 7B illustrates internal wirings of the deflector of FIG. 7A.
Figure 7C:
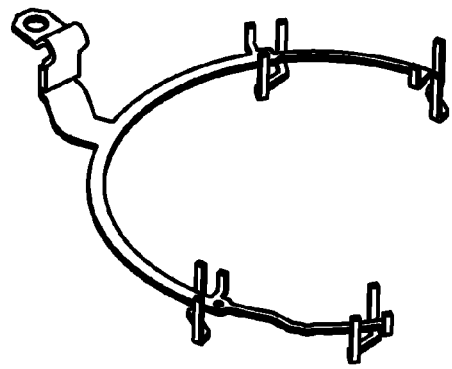
FIG. 7C illustrates the deflector of FIG. 7A, wherein only the U-phase outgoing line inside the deflector is shown.
Figure 7D:
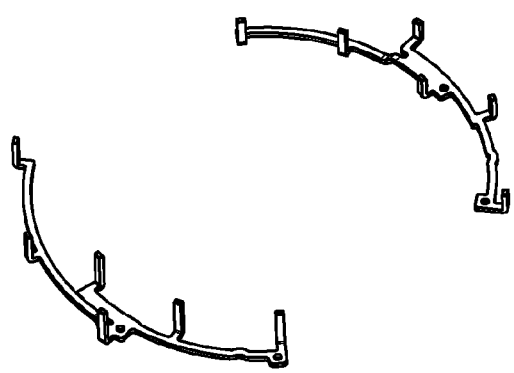
FIG. 7D illustrates the deflector of FIG. 7A, wherein only the neutral line within the deflector is shown.

The outlet wires of the three phases (U, V and W phases) of the stator are at the soldered ends of the U-shaped flat copper wires 10 of the stator winding structure 100. Accordingly, a deflector 12 (as shown in FIGS. 7A-7D) is also arranged at the solder end for the outlet wires of each phase. The stator of Example 1 is shown in FIGS. 3-4.

A perspective view, a wiring structure, and an expansion diagram from the U-shaped end (first side) of the four parallel-winding branches of the U-phase winding structure 100U of Example I are shown in FIGS. 5-6, FIGS. 8A-8D and FIGS. 9A-9D respectively.

Each phase includes four parallel-winding branches: a first parallel-winding branch, a second parallel-winding branch, a third parallel-winding branch and a fourth parallel-winding branch respectively.

The first parallel-winding branch of the winding structure of phase U is connected in the following way as partially shown:

conductor of layer 1 in slot 1 being connected to the conductor of layer 2 in slot 7 at the U-shaped end by connecting part with pitch y;

conductor of layer 2 in slot 7 being connected to the conductor of layer 1 in slot 13 at the solder end by soldering;

conductor of layer 1 in slot 13 being connected to the conductor of layer 2 in slot 19 at the U-shaped end by connecting part with pitch y;

conductor of layer 2 in slot 19 being connected to the conductor of layer 3 in slot 25 by soldering at the solder end;

conductor of layer 3 in slot 25 being connected to the conductor of layer 4 in slot 31 at the U-shaped end by connecting part with pitch y.

According to the above, the complete connection of Example 1 can be seen as follows.

Figure 8A:
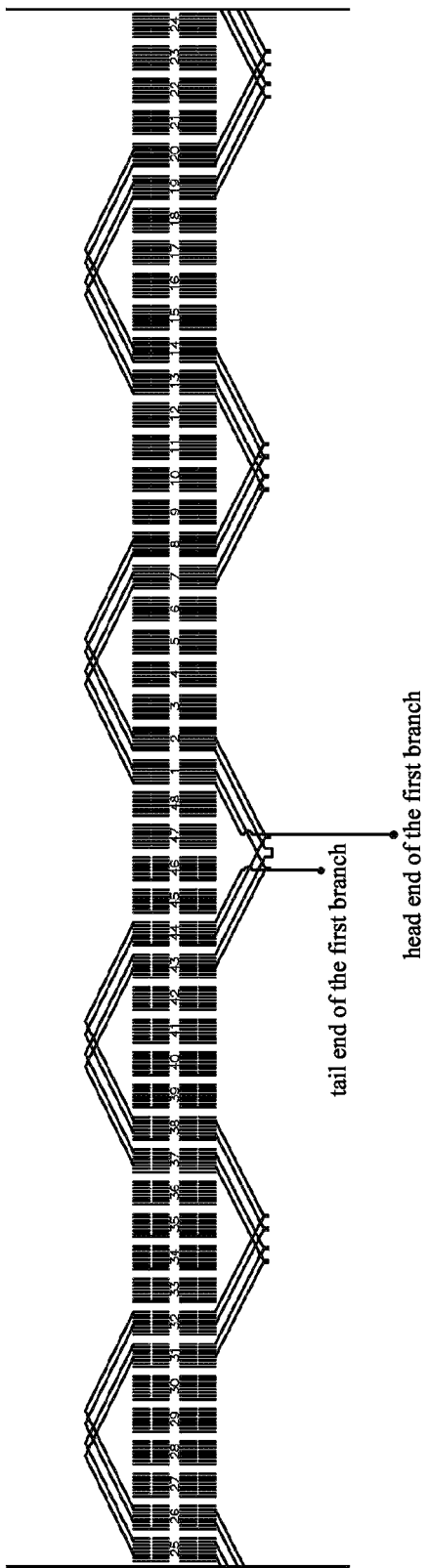
FIG. 8A illustrates the wiring structure of a first parallel-winding branch of the U-phase winding according to Example I of the present application.
Figure 8B:
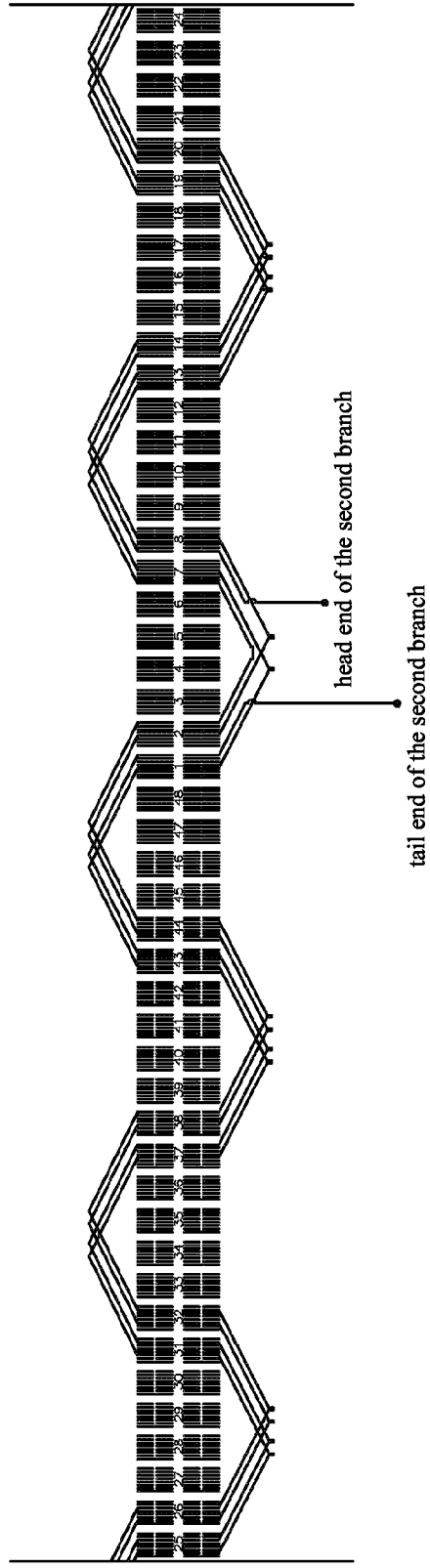
FIG. 8B illustrates the wiring structure of a second parallel-winding branch of the U-phase winding according to Example I of the present application.
Figure 8C:
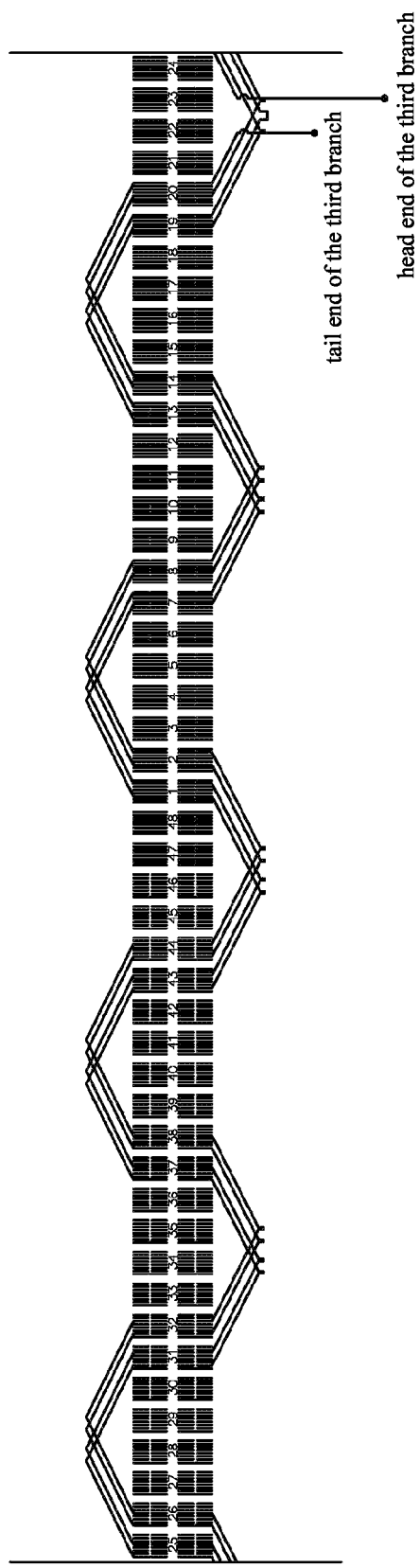
FIG. 8C illustrates the wiring structure of a third parallel-winding branch of the U-phase winding according to Example I of the present application.
Figure 8D:
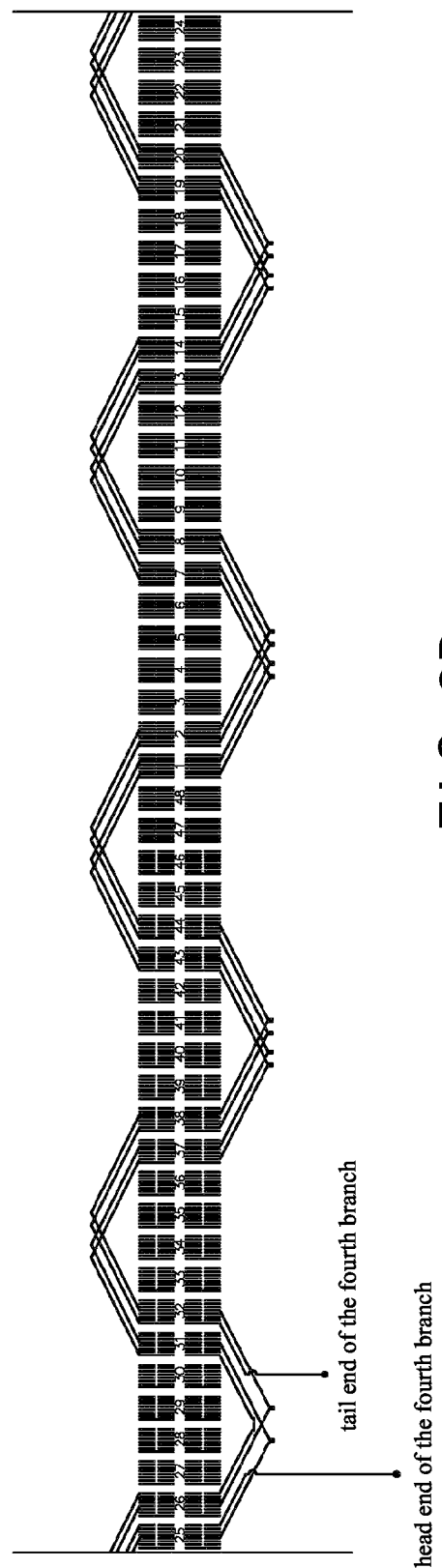
FIG. 8D illustrates the wiring structure of a fourth parallel-winding branch of the U-phase winding according to Example I of the present application.
Figure 9A:
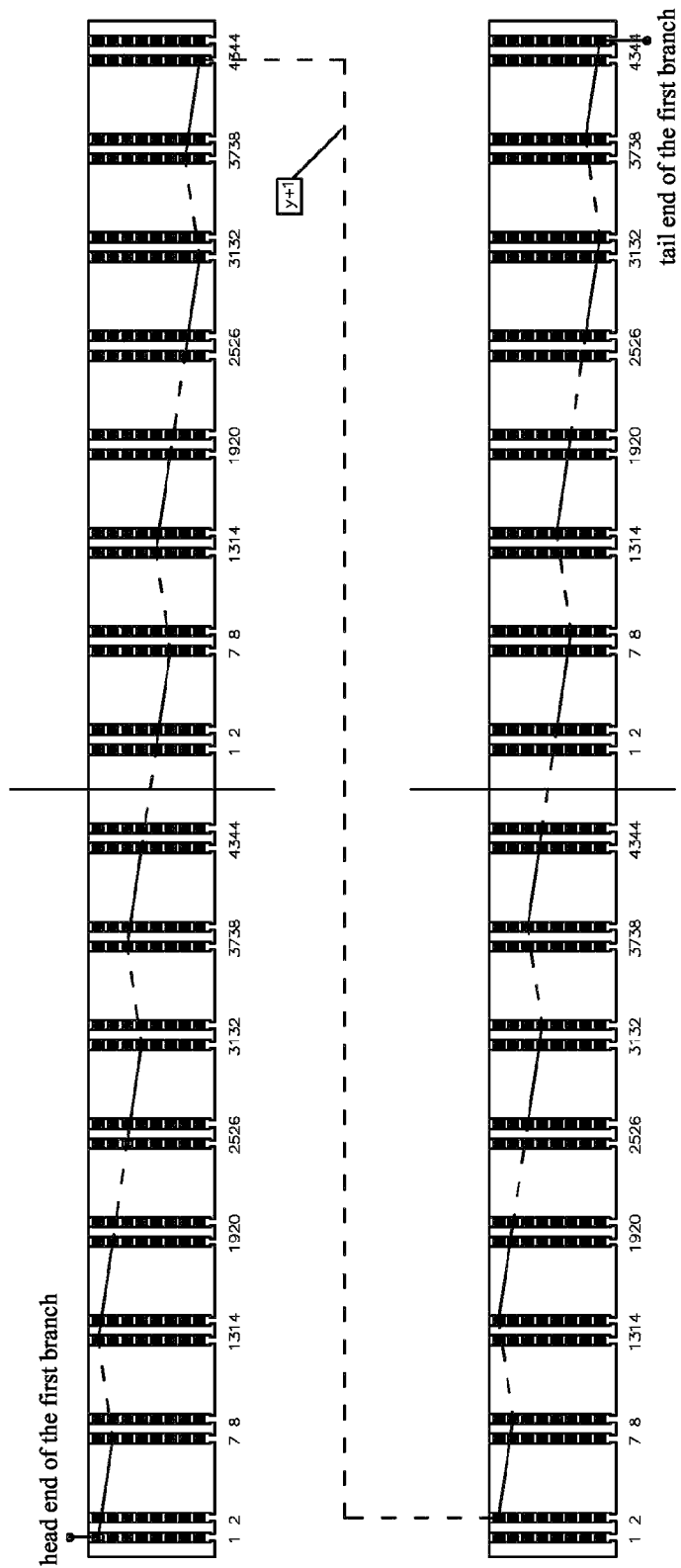
FIG. 9A illustrates the diagram of wiring expansion at the U-shaped end of the first parallel-winding branch of the U-phase winding according to Example I of the present application.
Figure 9B:
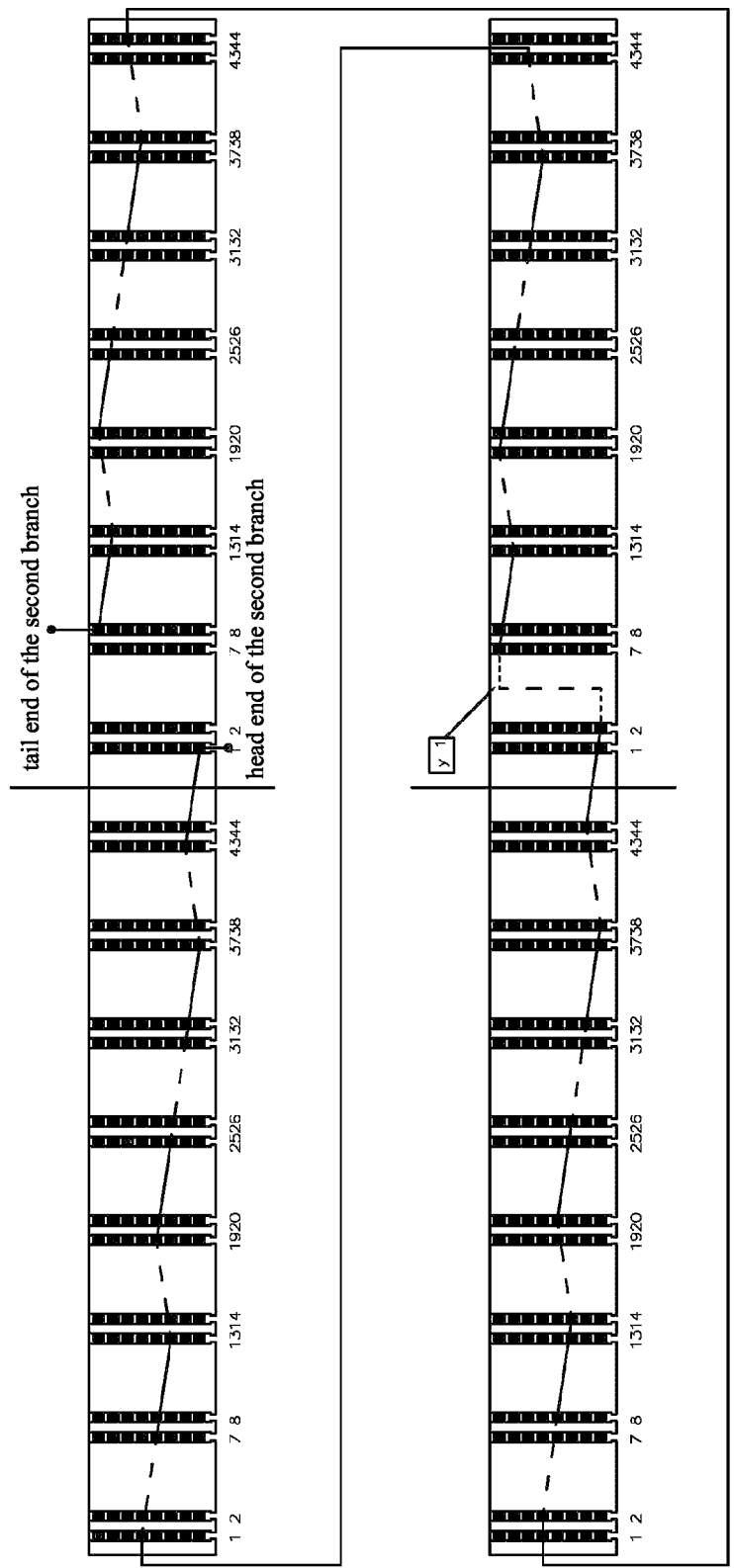
FIG. 9B illustrates the diagram of wiring expansion at the U-shaped end of the second parallel-winding branch of the U-phase winding according to Example 1 of the present application.
Figure 9C:
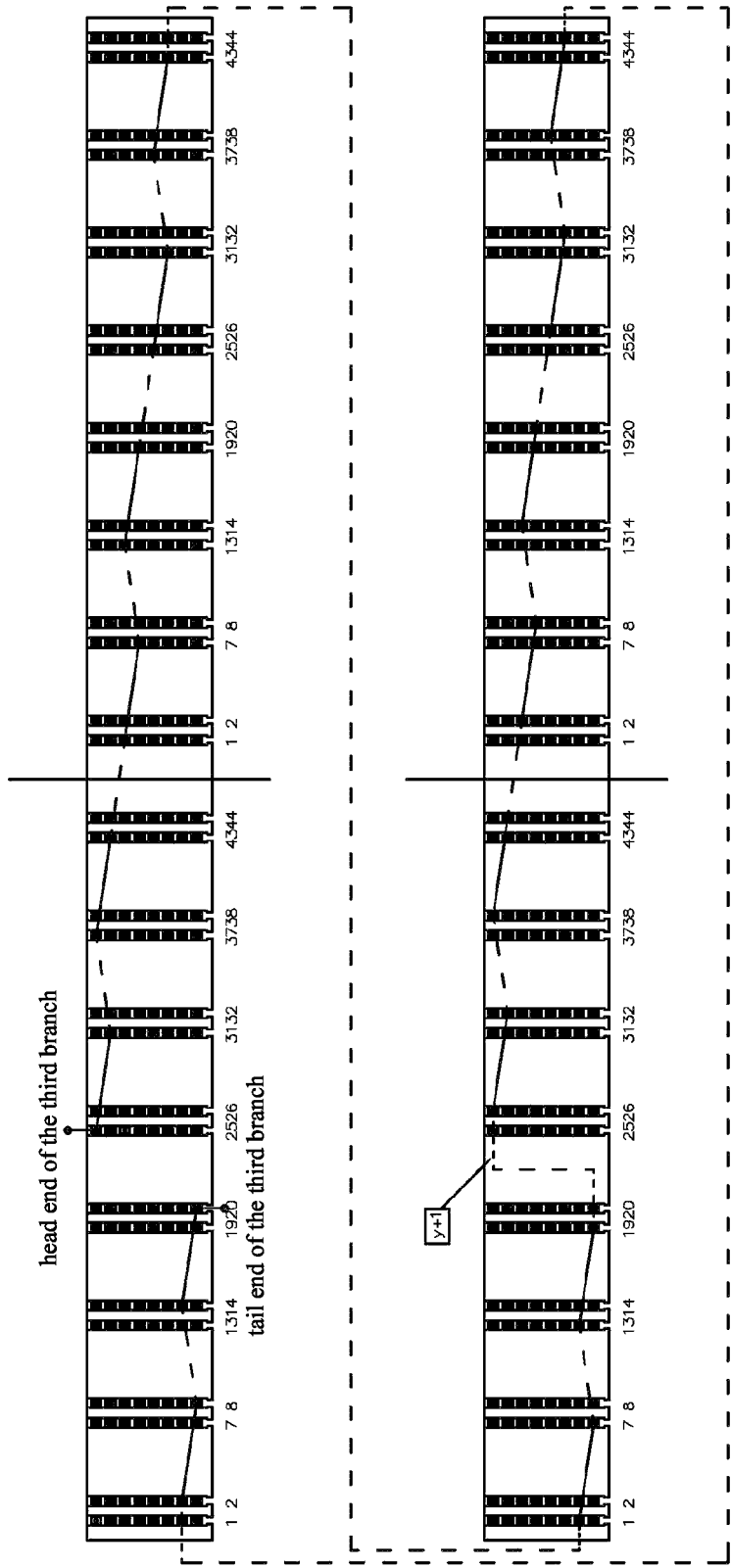
FIG. 9C illustrates the diagram of wiring expansion at the U-shaped end of the third parallel-winding branch of the U-phase winding according to Example 1 of the present application.
Figure 9D:
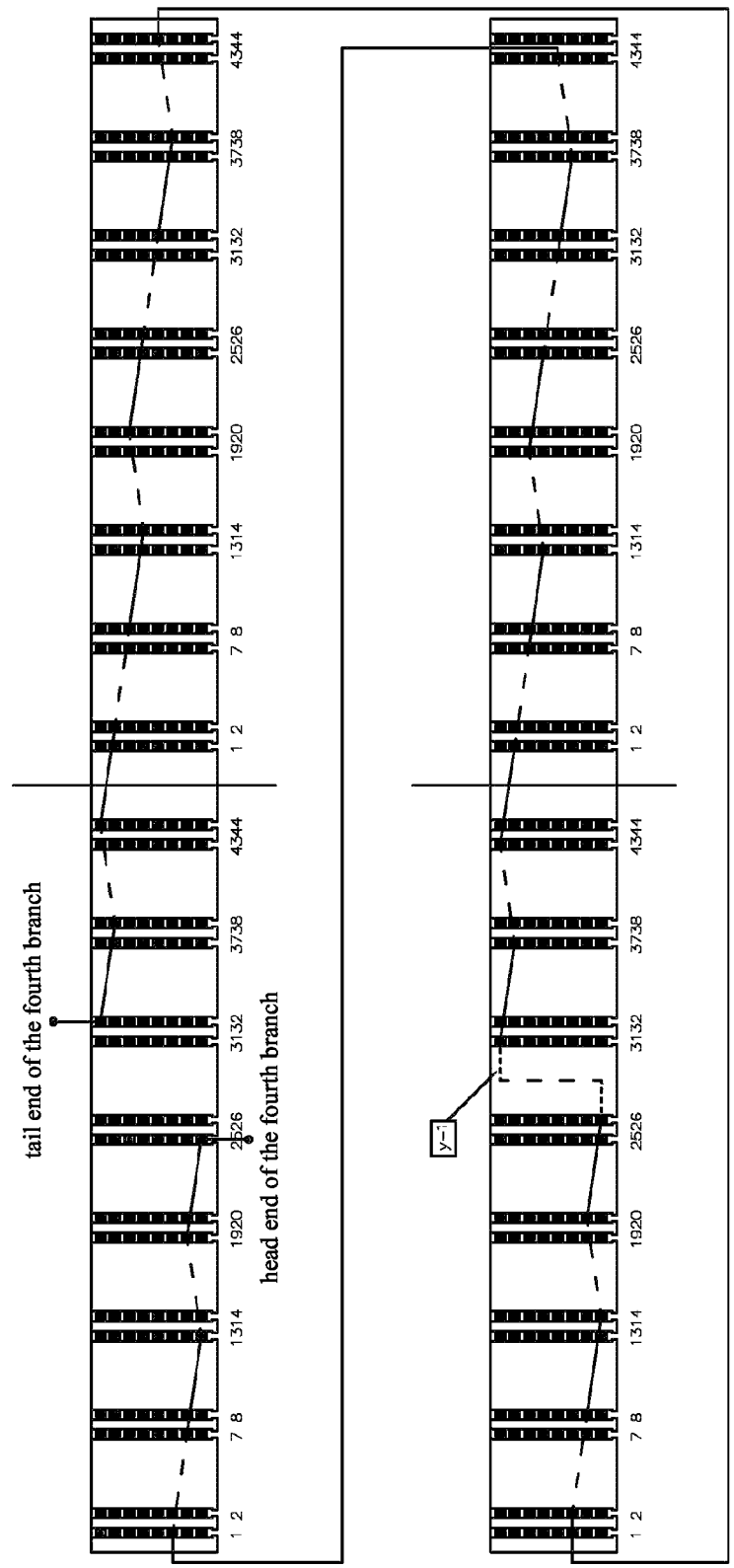
FIG. 9D illustrates the diagram of wiring expansion at the U-shaped end of the fourth parallel-winding branch of the U-phase winding according to Example 1 of the present application.

As shown in FIG. 8A and FIG. 9A, the first parallel-winding branch of phase U is connected as:

1.1ˆ7.2-13.1ˆ19.2-25.3ˆ31.4-37.3ˆ43.4-1.5ˆ7.6-13.5ˆ19.6-25.7ˆ31.8-37.7ˆ43.8↔2.1ˆ8.2-14.1ˆ20.2-26.3ˆ32.4-38.3ˆ44.4-2.5ˆ8.6-14.5ˆ20.6-26.7ˆ32.8-38.7ˆ44.8 (Note: "ˆ" represents connected with connecting part, "-" represents connected by soldering, "↔" represents connected with deflector);

As shown in FIG. 8B and FIG. 9B, the second parallel-winding branch of Phase U is connected as:

1.8ˆ43.7-37.8ˆ31.7-25.6ˆ19.5-13.6ˆ7.5-1.4ˆ43.3-37.4ˆ31.3-25.2ˆ19.1-13.2  ˆ7.1↔2.8ˆ44.7-38.8ˆ32.7-26.6ˆ20.5-14.6ˆ8.5-2.4ˆ44.3-38.4ˆ32.3-26.2ˆ20.1-14.2ˆ8.1 (Note: "ˆ" represents connected with connecting part, "-" represents connected by soldering, "↔" represents connected with deflector);

As shown in FIG. 8C and FIG. 9C, the third parallel-winding branch of phase U is connected as:

25.1ˆ31.2-37.1ˆ43.2-1.3ˆ7.4-13.3ˆ19.4-25.5ˆ31.6-37.5ˆ43.6-1.7ˆ7.8-13.7ˆ19.8↔26.1ˆ32.2-38.1ˆ44.2-2.3ˆ8.4-14.3ˆ20.4-26.5ˆ32.6-38.5ˆ44.6-2.7ˆ8.8-14.7ˆ20.8 (Note: "ˆ" represents connected with connecting part, "-" represents connected by soldering, "↔" represents connected with deflector);

As shown in FIG. 8D and FIG. 9D, the fourth parallel-winding branch of phase U is connected as:

25.8ˆ19.7-13.8ˆ7.7-1.6ˆ43.5-37.6ˆ31.5-25.4ˆ19.3-13.4ˆ7.3-1.2ˆ43.1-37.2ˆ31.1↔26.8ˆ20.7-14.8ˆ8.7-2.6ˆ44.5-38.6ˆ32.5-26.4ˆ20.3-14.4ˆ8.3-2.2ˆ44.1-38.2ˆ32.1 (Note: "ˆ" represents connected with connecting part, "-" represents connected by soldering, "↔" represents connected with deflector).

The winding structures of Phase V and Phase W can be obtained according to the above patterns, and thus not repeated here.

Example II

In this example of a three-phase AC motor, a stator comprises a stator core 11 and a stator winding structure 100. The stator core 11 has a plurality of slots distributed thereon circumferentially. The stator winding structure 100 consists of a plurality of U-shaped flat copper wires 10.

Figure 10:
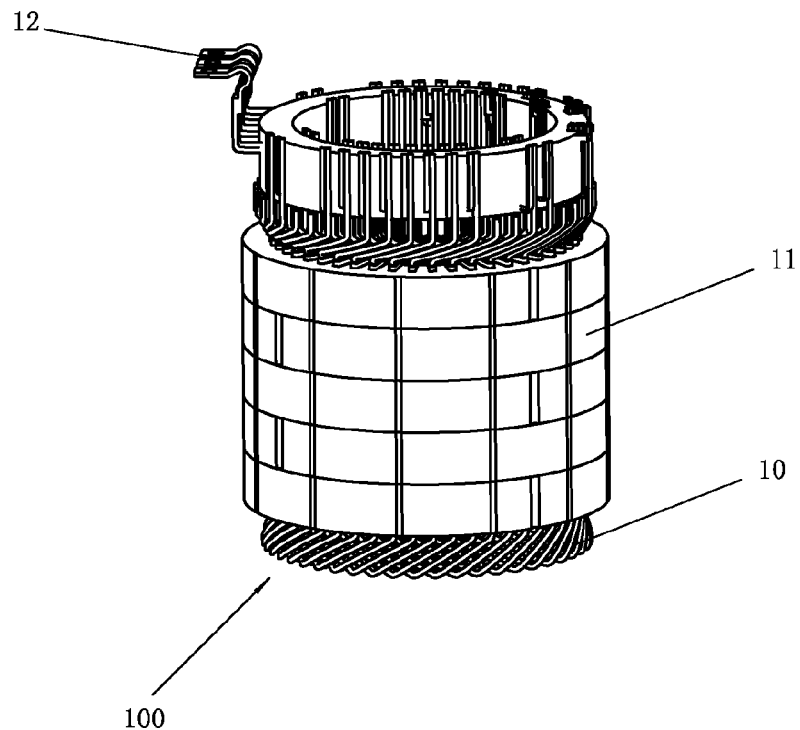
FIG. 10 illustrates a perspective view of the stator according to Example II of the present application, with solder end at the top.
Figure 11:
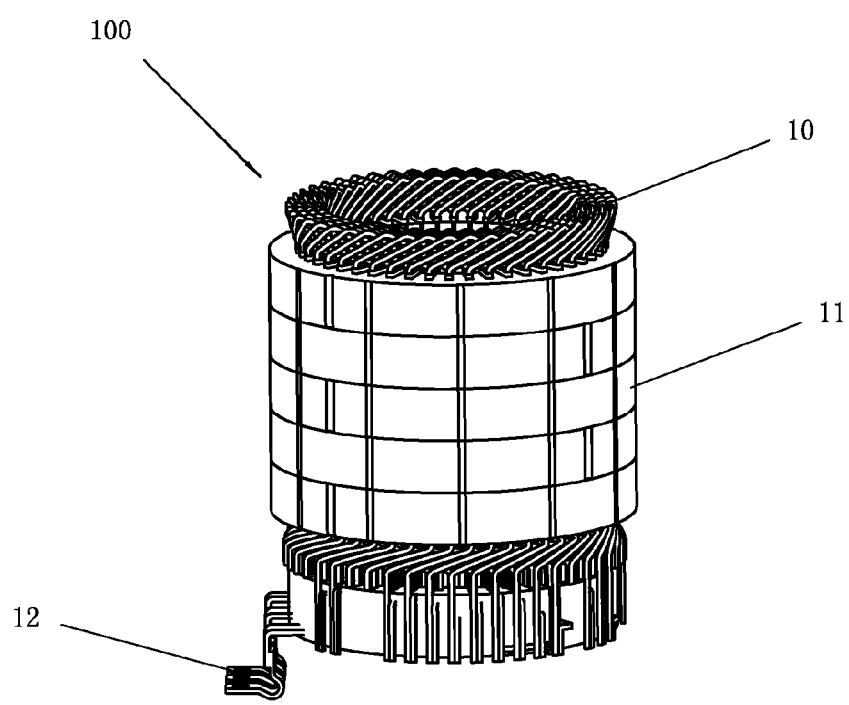
FIG. 11 illustrates a perspective view of the stator according to Example II of the present application, with U-shaped end at the top.
Figure 12:
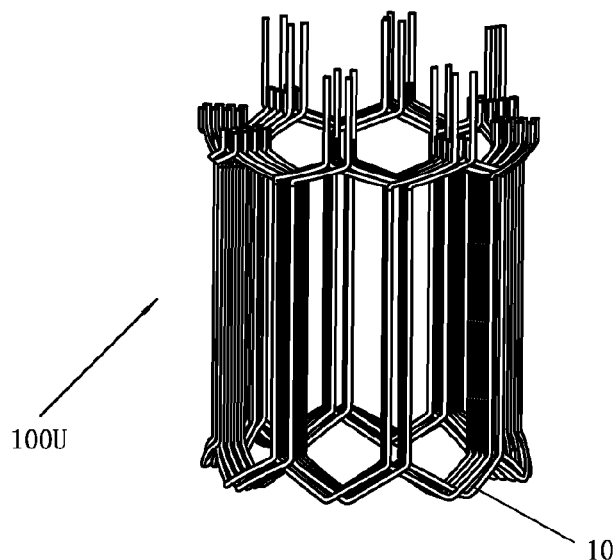
FIG. 12 illustrates a perspective view of the stator winding structure according to Example II of the present application, wherein only the U-phase winding is shown.
Figure 13:
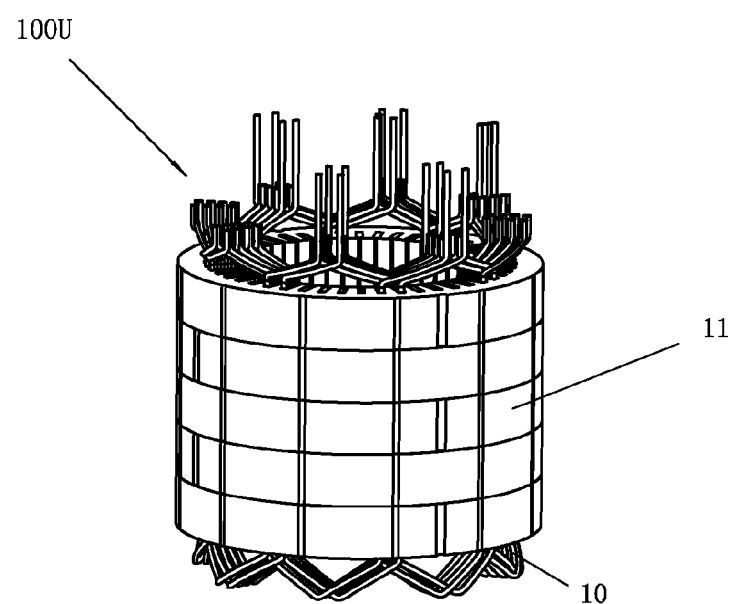
FIG. 13 illustrates a perspective view of the stator winding structure of FIG. 12, wherein the iron core is shown.
Figure 14A:
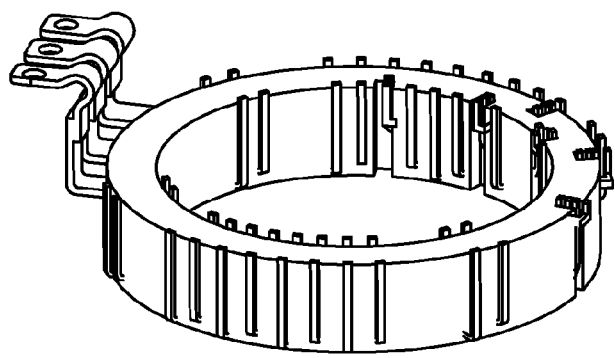
FIG. 14A illustrates a perspective view of the deflector for use in Example II of the present application.
Figure 14B:
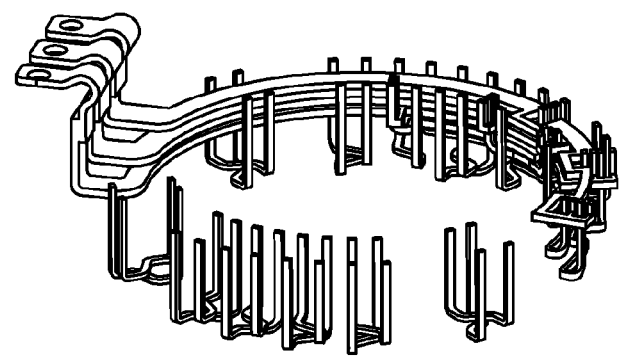
FIG. 14B illustrates internal wirings of the deflector of FIG. 14A.
Figure 14C:
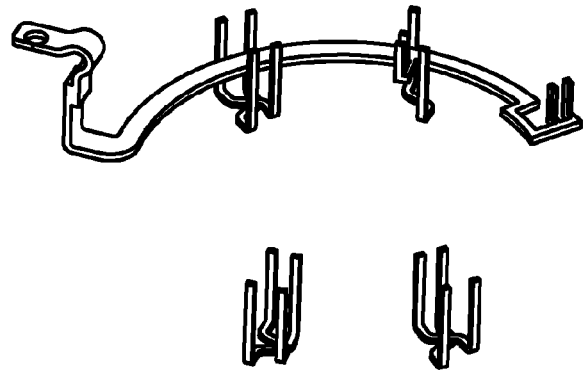
FIG. 14C illustrates the deflector of FIG. 14A, wherein only the U-phase outgoing line within the deflector is shown.
Figure 14D:
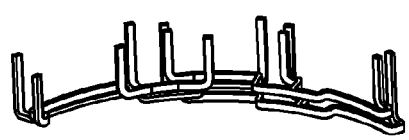
FIG. 14D illustrates the deflector of FIG. 14A, wherein only the neutral line within the deflector is shown.

The outlet wires of the three phases (U, V and W phases) of the stator are at the soldered ends of the U-shaped flat copper wires 10 of the stator winding structure 100. Accordingly, a deflector 12 (shown in FIGS. 14A-14D) is also arranged at the solder end for the outlet wires of each phase. The stator of Example II is shown in FIGS. 10-11.

A perspective view, a wiring structure and an expansion diagram from the U-shaped end (first side) of the four parallel-winding branches of the U-phase winding structure 100U of Example II are shown in FIGS. 12-13, FIGS. 15A-15D and FIGS. 16A-16D, respectively.

Each phase includes four parallel-winding branches: a first parallel-winding branch, a second parallel-winding branch, a third parallel-winding branch and a fourth parallel-winding branch, respectively.

The first parallel-winding branch of the winding structure of phase U is connected in the following way partially shown as:

conductor of layer 1 in slot 13 being connected to conductor of layer 2 in slot 19 at the U-shaped end with connecting part with pitch y;

conductor of layer 2 in slot 19 being connected to conductor of layer 3 in slot 25 at the solder end by soldering.

conductor of layer 3 in slot 25 being connected to conductor of layer 4 in slot 31 at the U-shaped end with a connecting part with pitch y;

conductor of layer 4 in slot 31 being connected to conductor of layer 3 in slot 37 at the solder end by soldering.

conductor of layer 3 in slot 37 being connected to the conductor of layer 4 in slot 43 at the U-shaped end by connecting part with pitch y.

According to the above, the complete connection of Example II can be seen as follows.

Figure 15A:
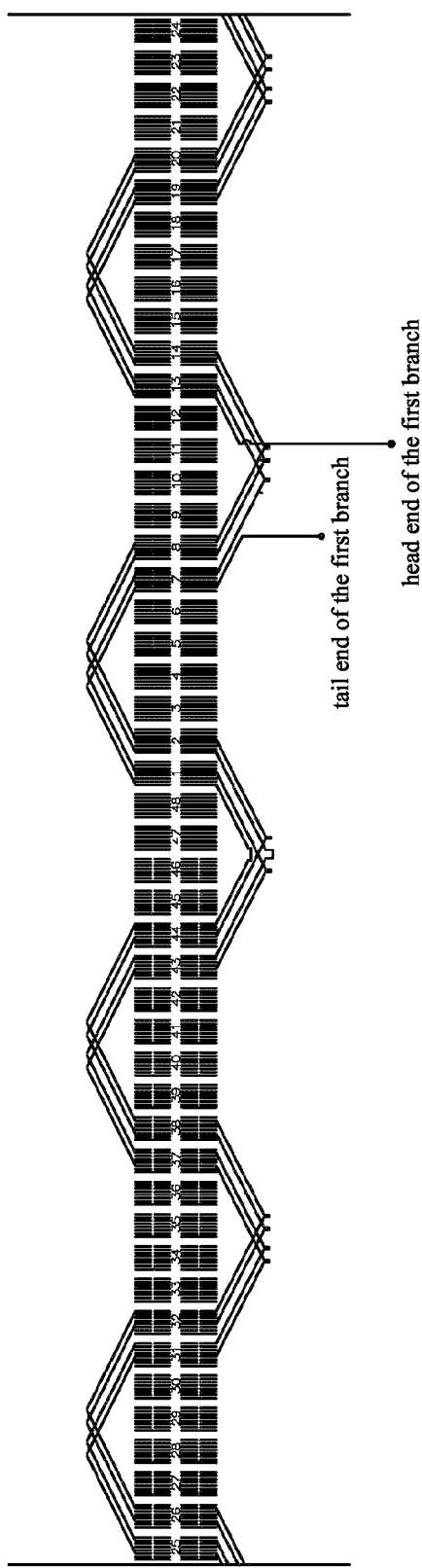
FIG. 15A illustrates the wiring structure of a first parallel-winding branch of the U-phase winding according to Example II of the present application.
Figure 16A:
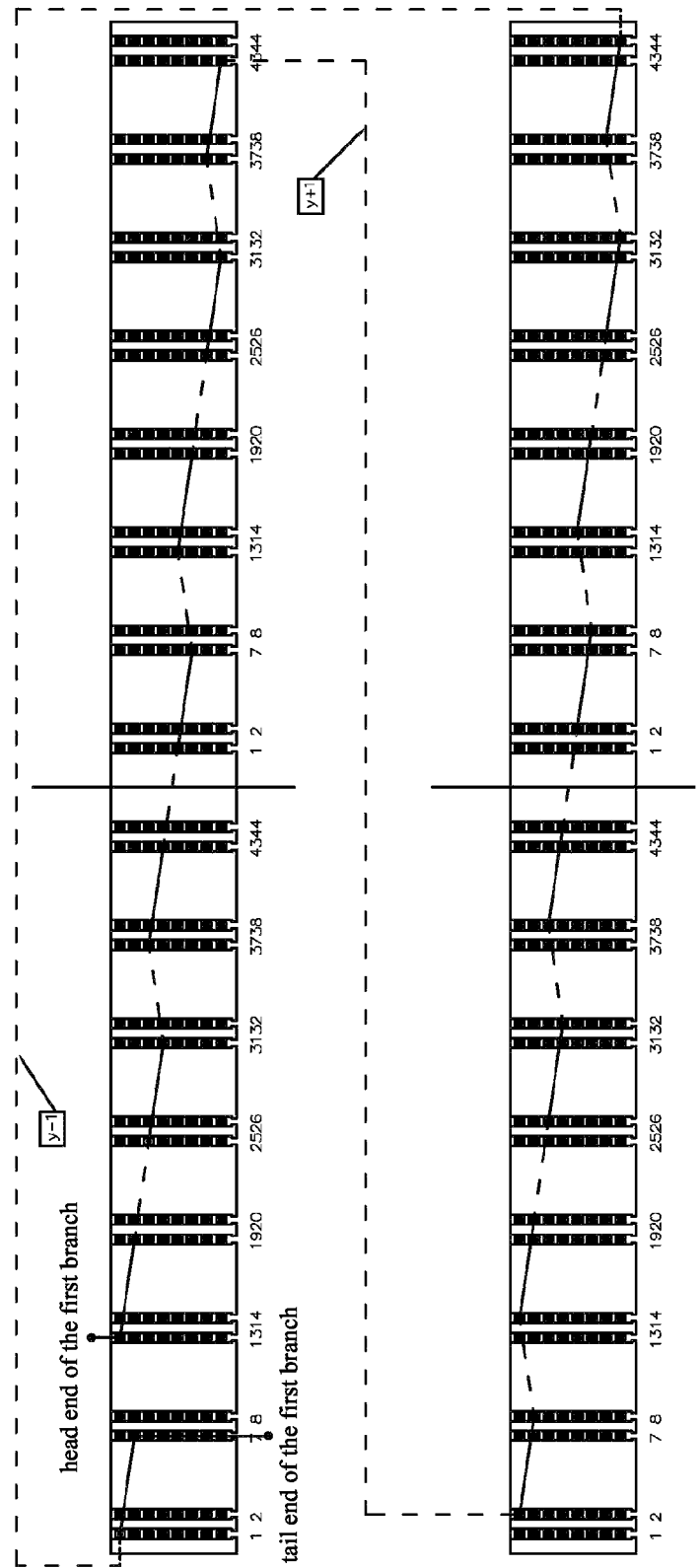
FIG. 16A illustrates the diagram of wiring expansion at the U-shaped end of the first parallel-winding branch of the U-phase winding according to Example II of the present application.

As shown in FIG. 15A and FIG. 16A, the first parallel-winding branch of phase U is connected as:

13.1ˆ19.2-25.3ˆ31.4-37.3ˆ43.4-1.5ˆ7.6-13.5ˆ19.6-25.7ˆ31.8-37.7ˆ43.8↔2.1ˆ8.2-14.1ˆ20.2-26.3ˆ32.4-38.3ˆ44.4-2.5ˆ8.6-14.5ˆ20.6-26.7ˆ32.8-38.7ˆ44.8 ↔1.1ˆ7.2

Figure 15B:
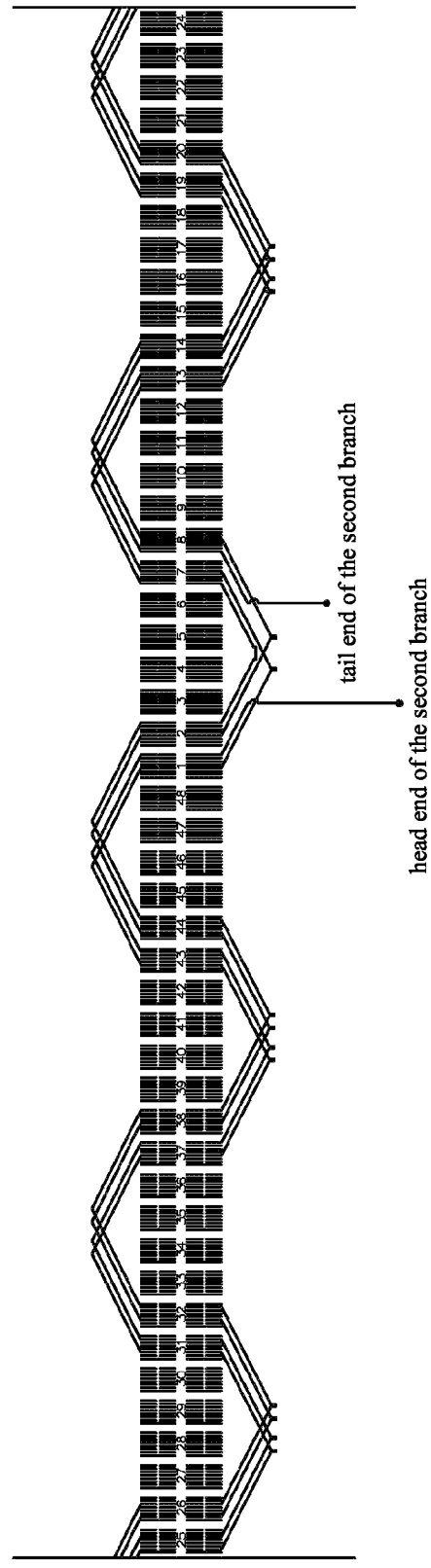
FIG. 15B illustrates the wiring structure of a second parallel-winding branch of the U-phase winding according to Example II of the present application.
Figure 15C:
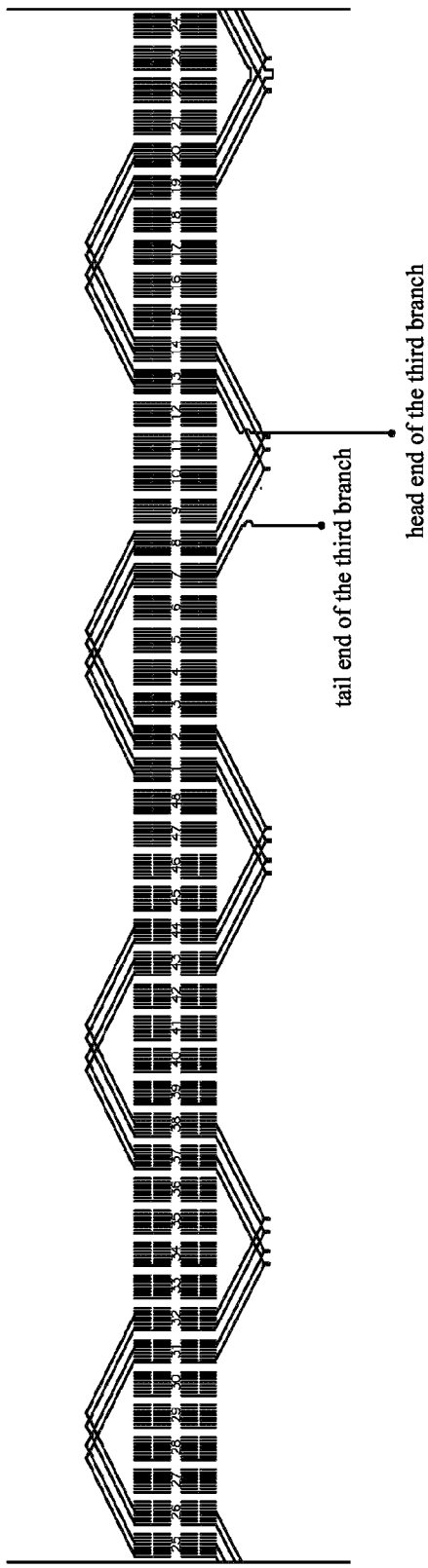
FIG. 15C illustrates the wiring structure of a third parallel-winding branch of the U-phase winding according to Example II of the present application.
Figure 15D:
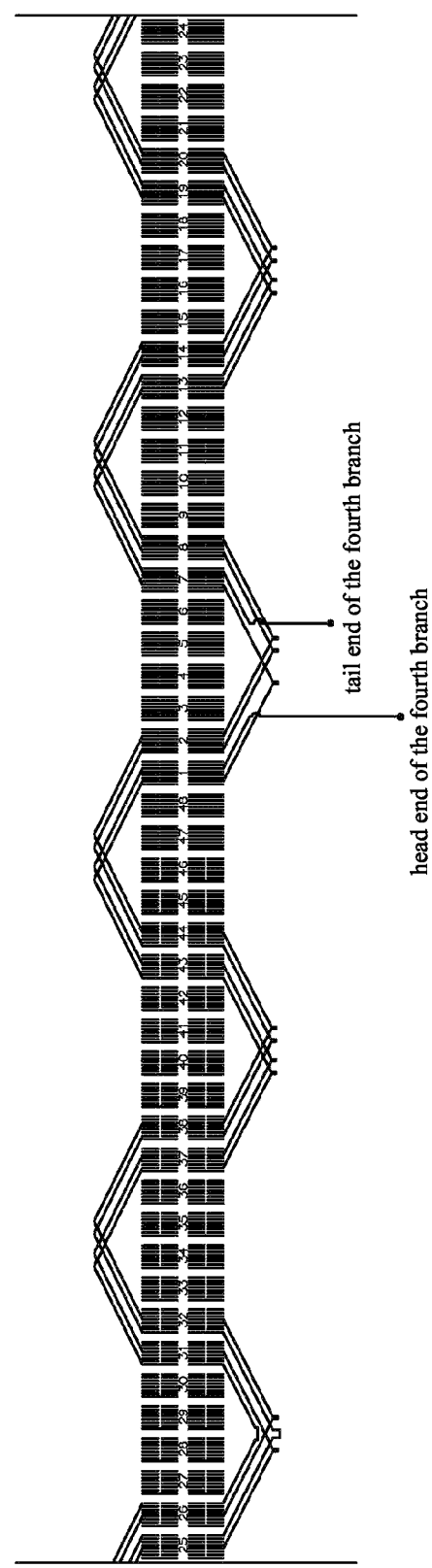
FIG. 15D illustrates the wiring structure of a fourth parallel-winding branch of the U-phase winding according to Example II of the present application.
Figure 16B:
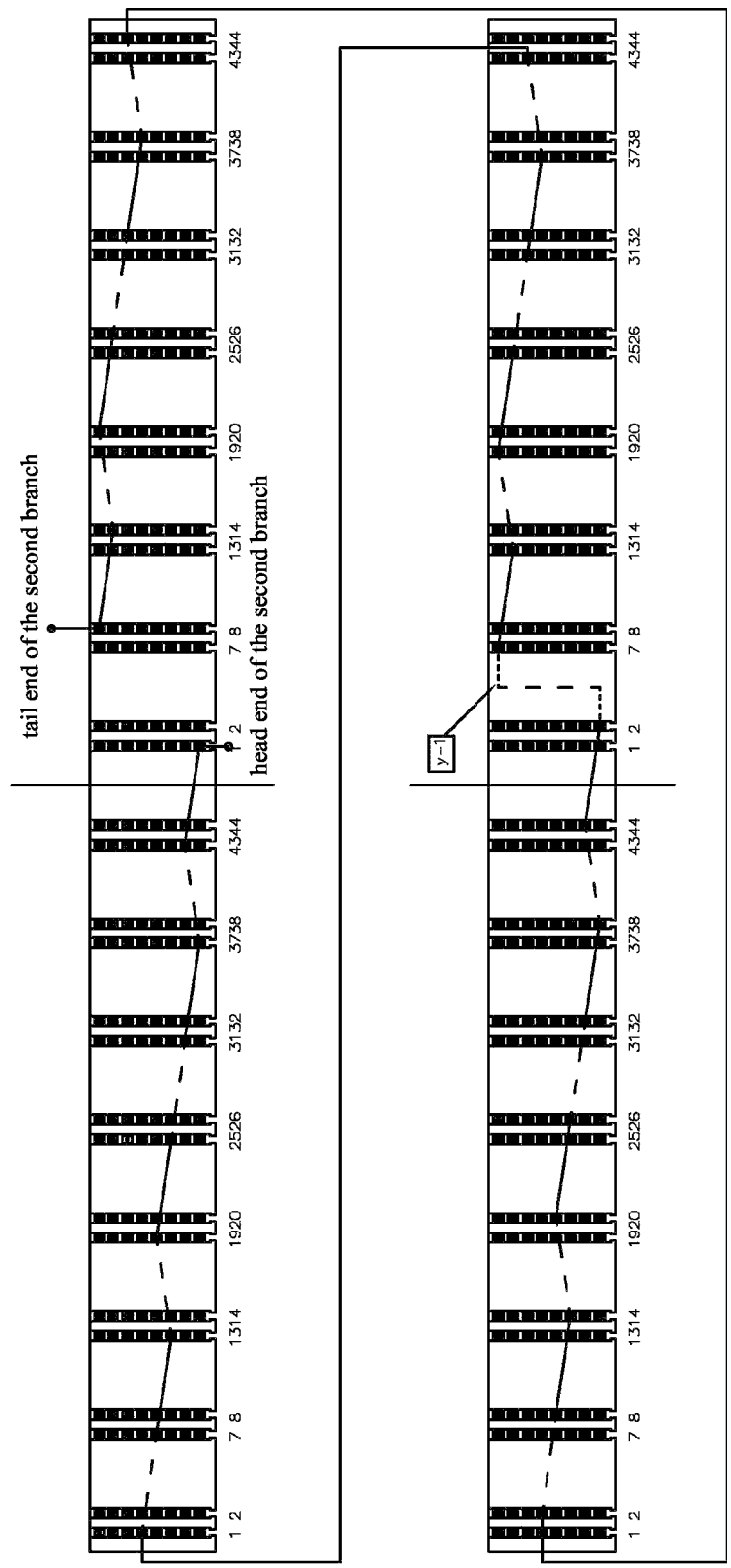
FIG. 16B illustrates the diagram of wiring expansion at the U-shaped end of the second parallel-winding branch of the U-phase winding according to Example II of the present application.
Figure 16C:
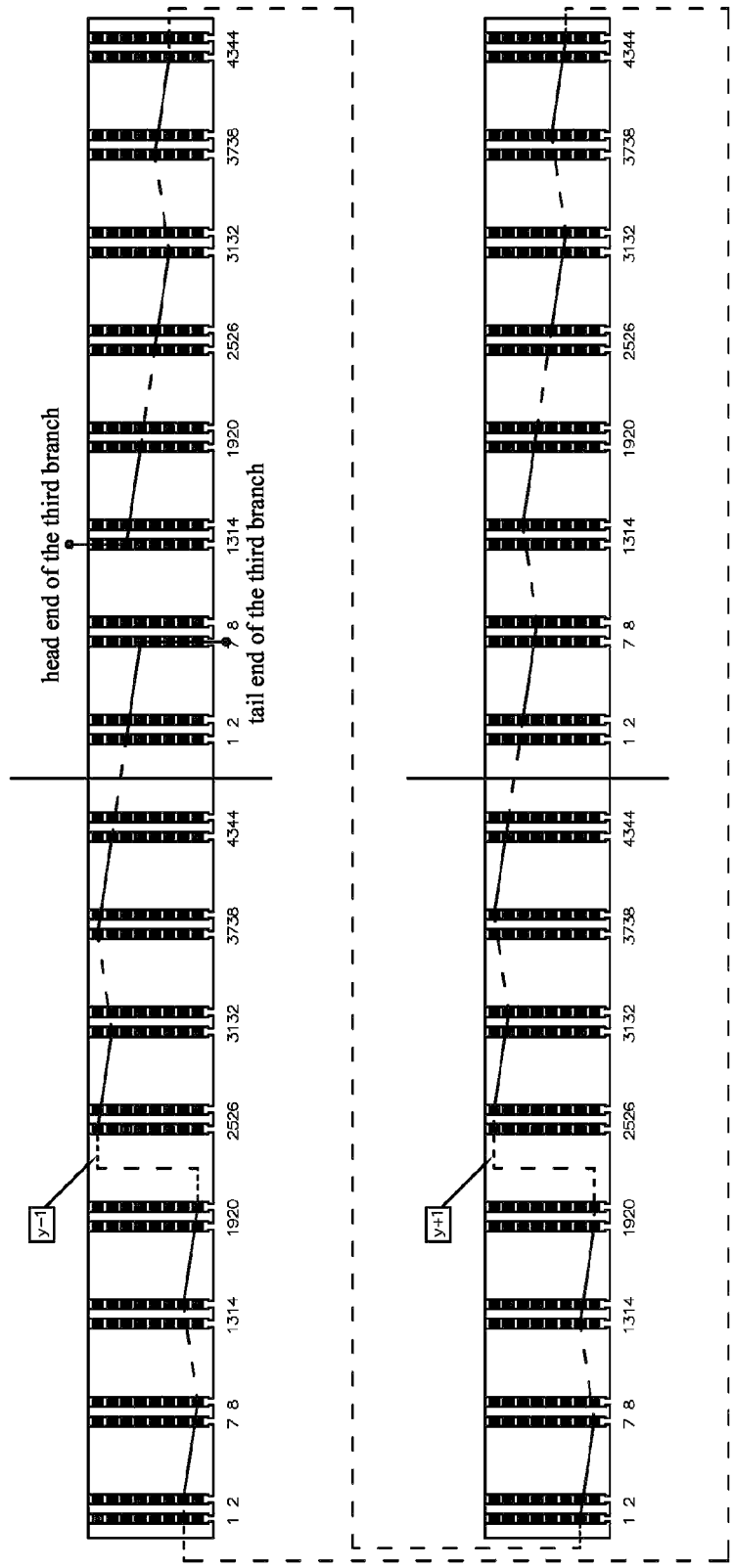
FIG. 16C illustrates the diagram of wiring expansion at the U-shaped end of the third parallel-winding branch of the U-phase winding according to Example II of the present application.
Figure 16D:
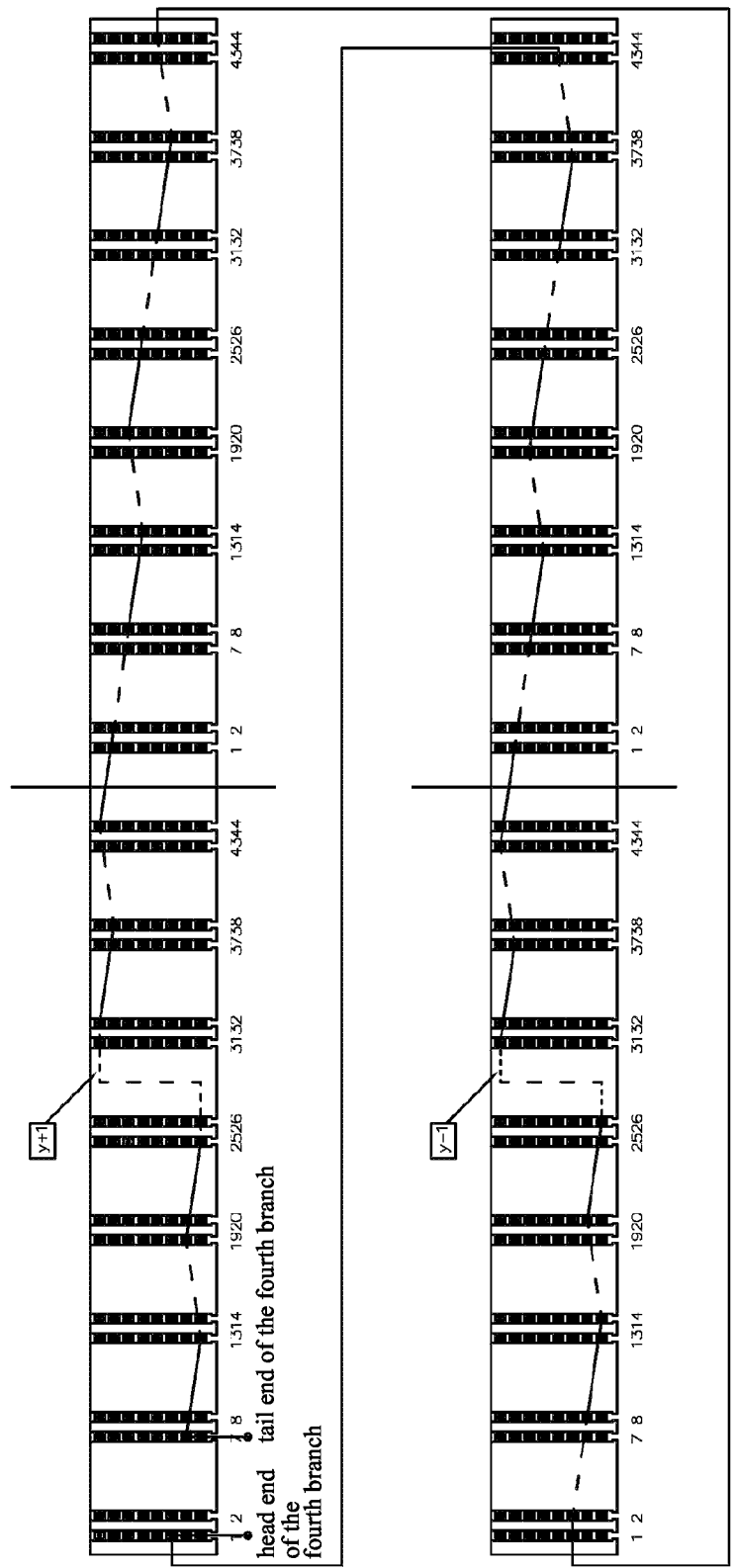
FIG. 16D illustrates the diagram of wiring expansion at the U-shaped end of the fourth parallel-winding branch of the U-phase winding according to Example II of the present application.

(Note: "^" represents connected with connecting part, "-" represents connected by soldering, "↔" represents connected with deflector);

As shown in FIG. 15B and FIG. 16B, the second parallel-winding branch of Phase U is connected as:
1.8^43.7-37.8^31.7-25.6^19.5-13.6^7.5-1.4^43.3-37.4^31.3-25.2^19.1-13.2 ^7.1↔2.8^44.7-38.8^32.7-26.6^20.5-14.6^8.5-2.4^44.3-38.4^32.3-26.2^20.1-14.2^8.1
(Note: "^" represents connected with connecting part, "-" represents connected by soldering, "↔" means by deflector connection);

As shown in FIG. 15C and FIG. 16C, the third parallel-winding branch of phase U is connected as:
13.3^19.4-25.5^31.6-37.5^43.6-1.7^7.8-13.7^19.8↔26.1^32.2-38.1^44.2-2.3^8.4-14.3^20.4-26.5^32.6-38.5^44.6-2.7^8.8-14.7^20.8↔25.1^31.2-37.1^43.2-1.3^7.4 (Note: "^" represents connected with connecting part, "-" represents connected by soldering, "↔" represents connected with deflector);

As shown in FIG. 15D and FIG. 16D, the fourth parallel-winding branch of phase U is connected as:
1.6^43.5-37.6^31.5-25.4^19.3-13.4^7.3-1.2^43.1-37.2^31.1↔26.8^20.7-14.8^8.7-2.6^44.5-38.6^32.5-26.4^20.3-14.4^8.3-2.2^44.1-38.2^32.1↔25.8^19.7-13.8^7.7
(Note: "^" represents connected by means of connecting parts, "-" represents connected by soldering, "↔" represents connected by defector connection).

The winding structure of Phase V and Phase W can be obtained according to the above patterns, and thus not repeated here.

Example III

In this example of a three-phase AC motor, a stator includes a stator core 11 and a stator winding structure 100. The stator core 11 has a plurality of slots distributed circumferentially. The stator winding structure 100 consists of a plurality of U-shaped flat copper wires 10.

Figure 17:
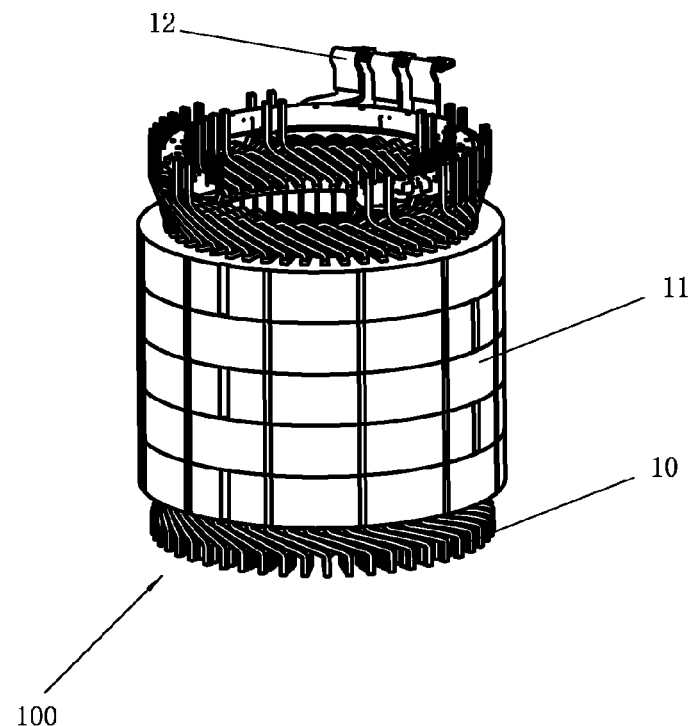
FIG. 17 illustrates a perspective view of the stator according to Example III of the present application, with the U-shaped end at the top.
Figure 18:
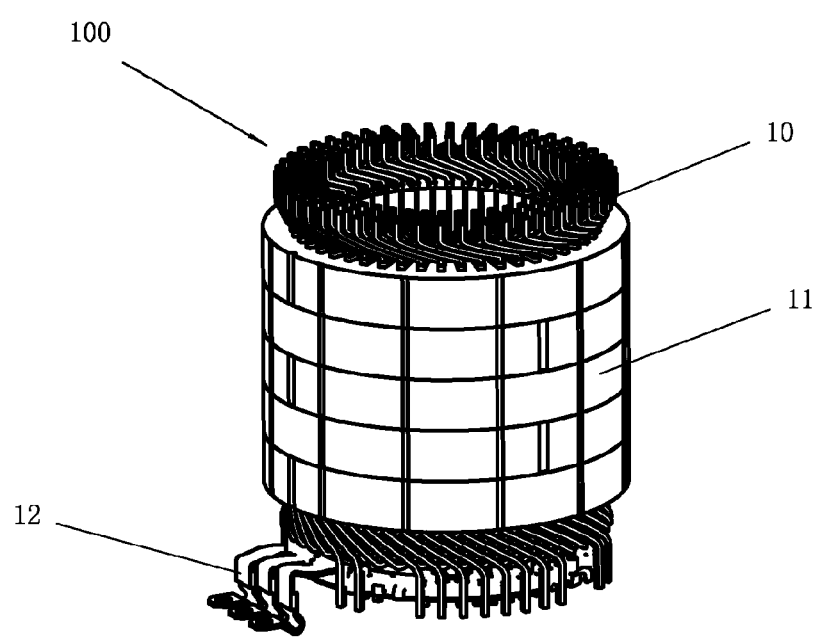
FIG. 18 illustrates a perspective view of the stator according to Example III of the present application, with the solder end at the top.
Figure 19:
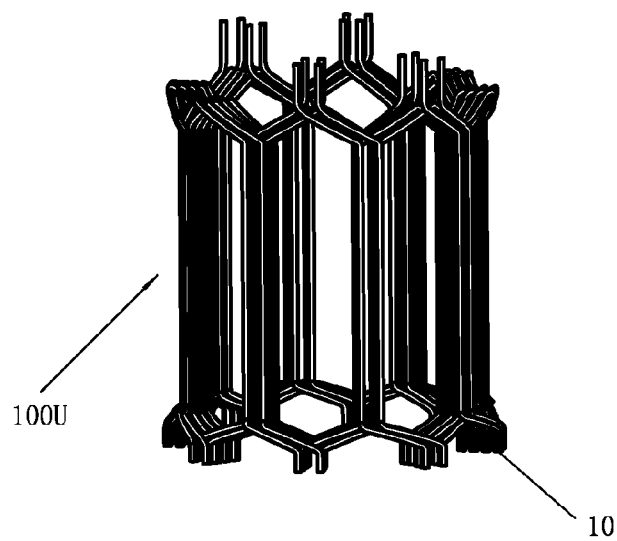
FIG. 19 illustrates a perspective view of the stator winding structure according to Example III of the present application, wherein only the U-phase winding is shown.
Figure 20:
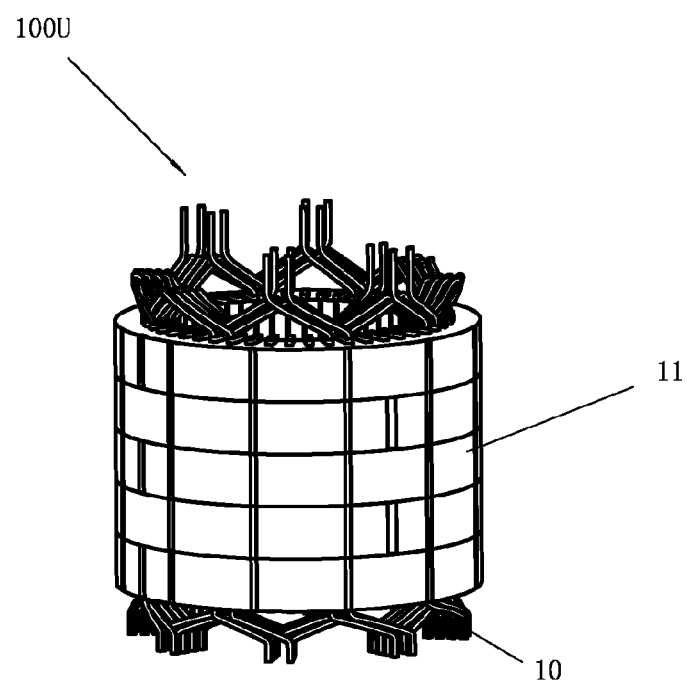
FIG. 20 illustrates a perspective view of the stator winding structure of FIG. 19, wherein the iron core is shown.

The outlet wires of the three phases (U, V and W phases) of the stator are at the soldered ends of the U-shaped flat copper wires 10 of the stator winding structure 100. Accordingly, a deflector 12 (shown in FIGS. 7A-7D) is also arranged at the solder end for the outlet wires of each phase. The stator of Example III is shown in FIGS. 17-18.

A perspective view, a wiring structure and an expansion diagram from the U-shaped end (first side) of the four parallel-winding branches of the U-phase winding structure 100U of Example III are shown in FIGS. 19-20, FIGS. 21A-21D and FIGS. 22A-22D, respectively.

Each phase includes four parallel-winding branches: a first parallel-winding branch, a second parallel-winding branch, a third parallel-winding branch and a fourth parallel-winding branch, respectively.

The first parallel-winding branch of the winding structure of phase U is connected in the following way partially shown as:
conductor of layer 1 in slot 8 being connected to conductor of layer 2 in slot 14 at the solder end by soldering with pitch y;
conductor of layer 2 in slot 14 being connected to conductor of layer 1 in slot 20 at the U-shaped end by connecting part;
conductor of layer 1 in slot 20 being connected to conductor of layer 2 in slot 26 at the solder end by soldering with pitch y;
conductor of layer 2 in slot 26 being connected to conductor of layer 3 in slot 32 at the U-shaped end by connecting part;
conductor of layer 3 in slot 32 being connected to conductor of layer 4 in slot 38 at the solder end by soldering with pitch y.

Based on the above, the complete connection of Example III can be seen as follows.

Figure 21A:
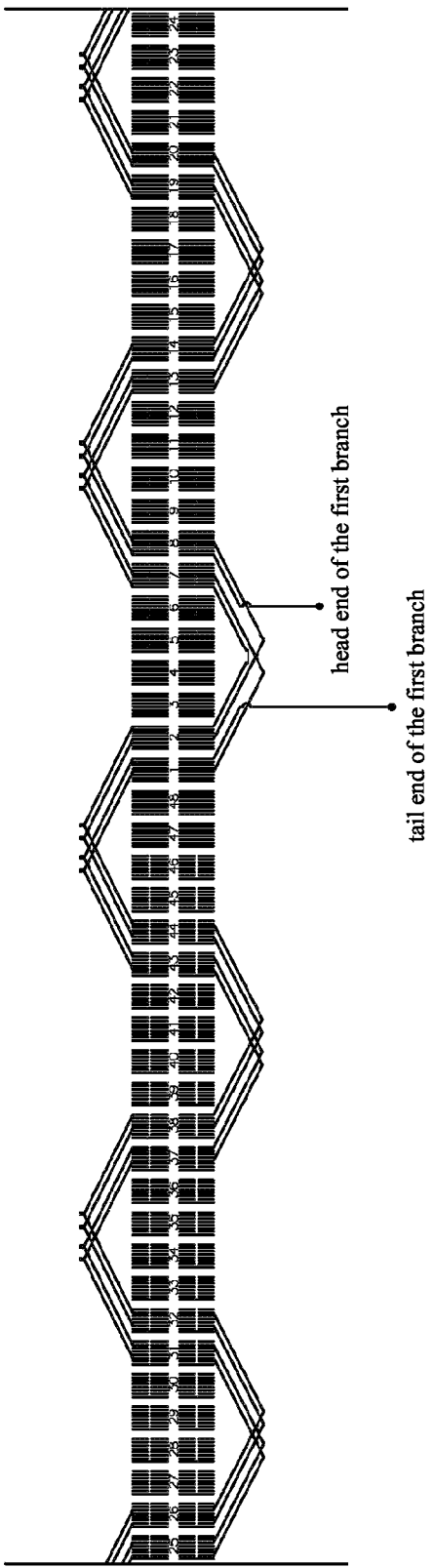
FIG. 21A illustrates the wiring structure of the first parallel-winding branch of the U-phase winding according to Example III of the present application.
Figure 21B:
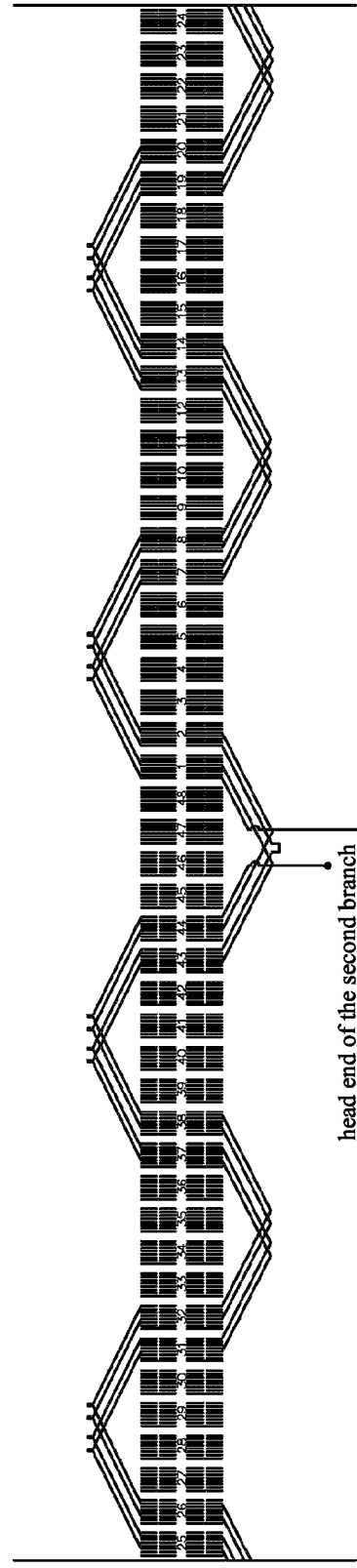
FIG. 21B illustrates the wiring structure of a second parallel-winding branch of the U-phase winding according to Example III of the present application.
Figure 21C:
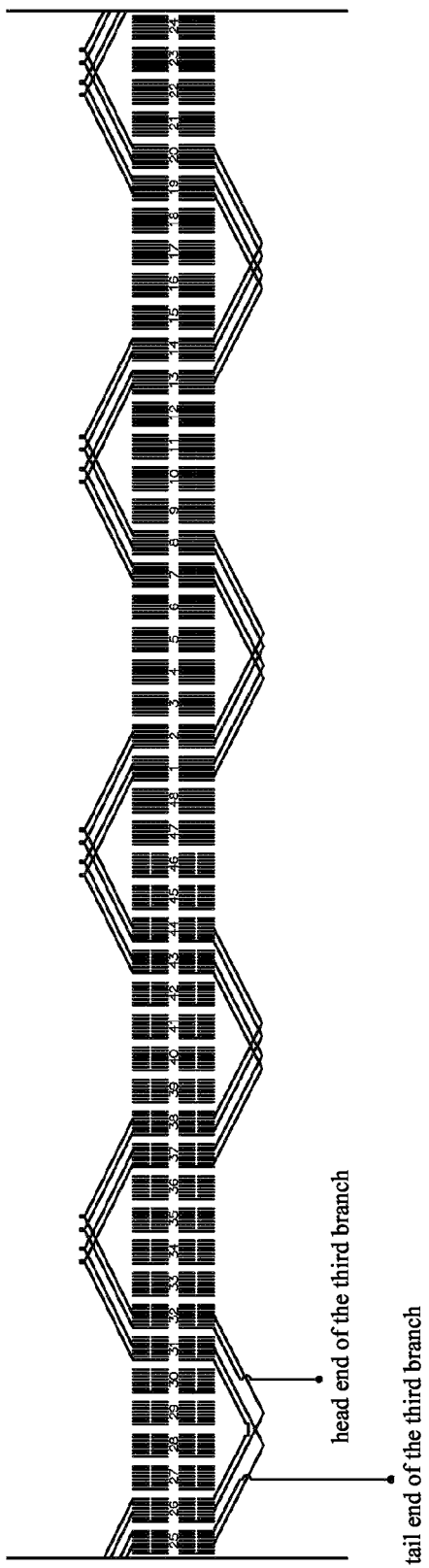
FIG. 21C illustrates the wiring structure of a third parallel-winding branch of the U-phase winding according to Example III of the present application.
Figure 21D:
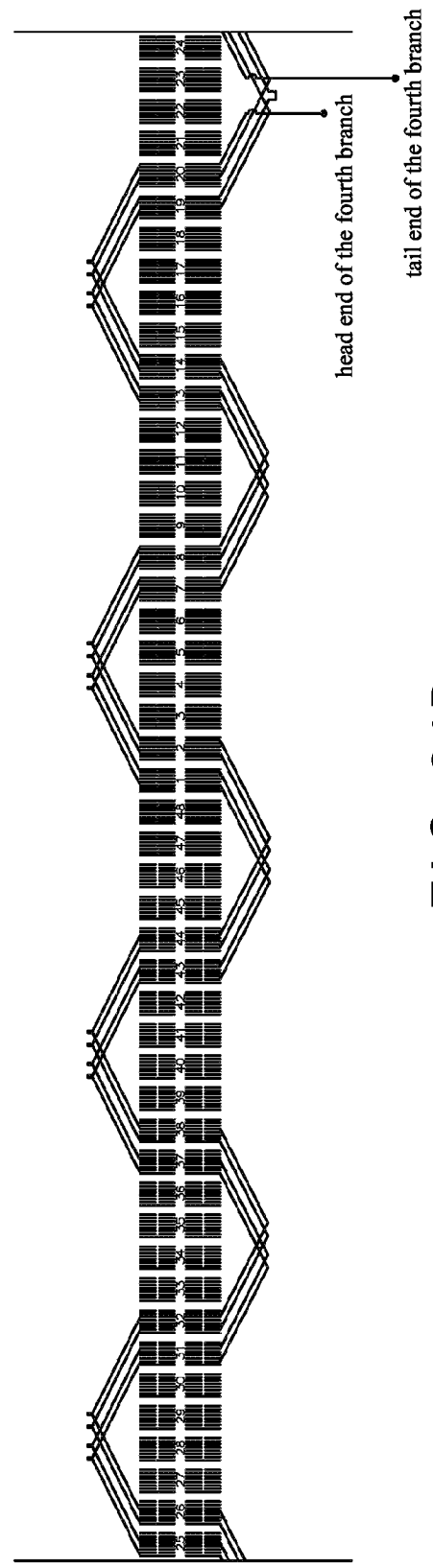
FIG. 21D illustrates the wiring structure of a fourth parallel-winding branch of the U-phase winding according to Example III of the present application.
Figure 22A:
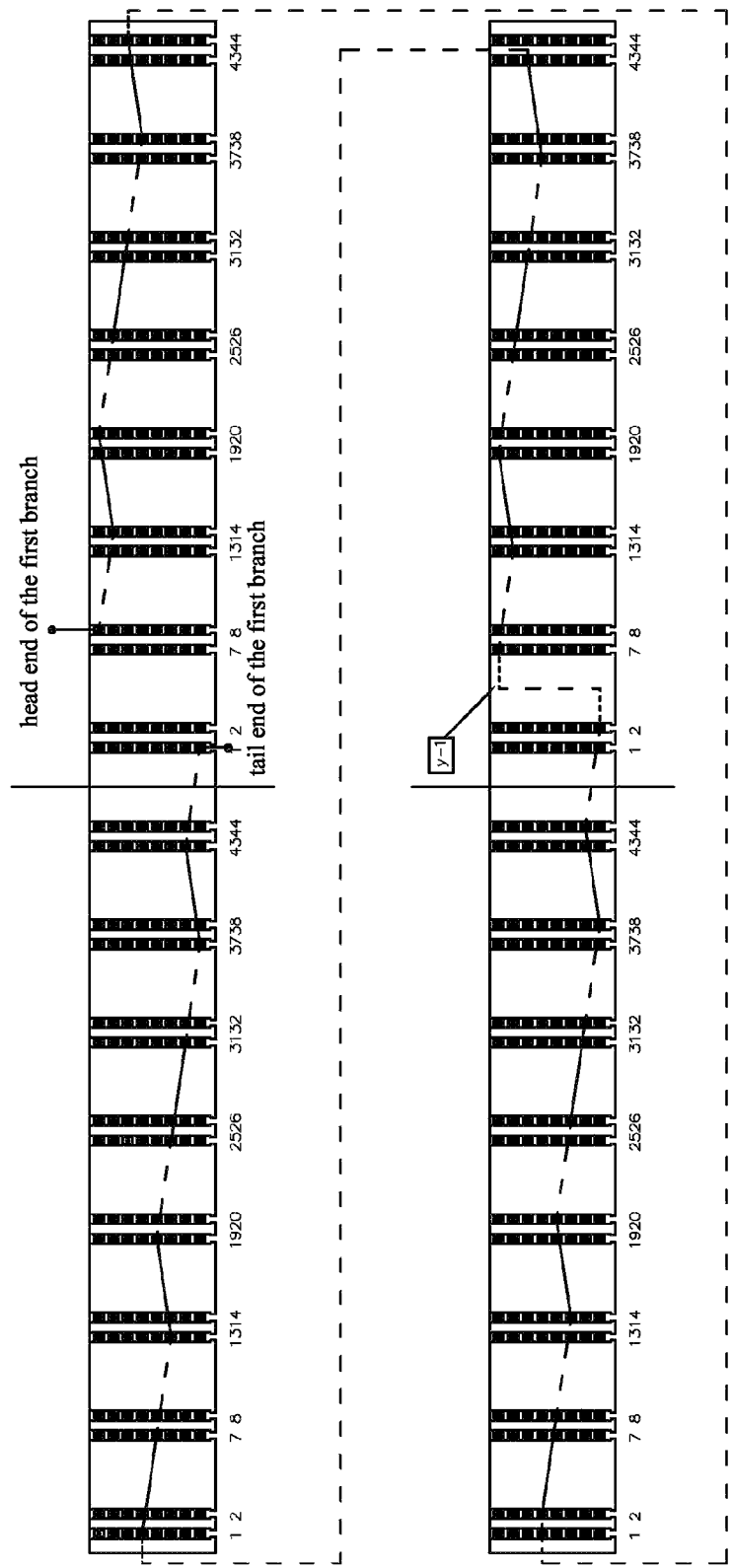
FIG. 22A illustrates the diagram of wiring expansion at the U-shaped end of the first parallel-winding branch of the U-phase winding according to Example III of the present application.
Figure 22B:
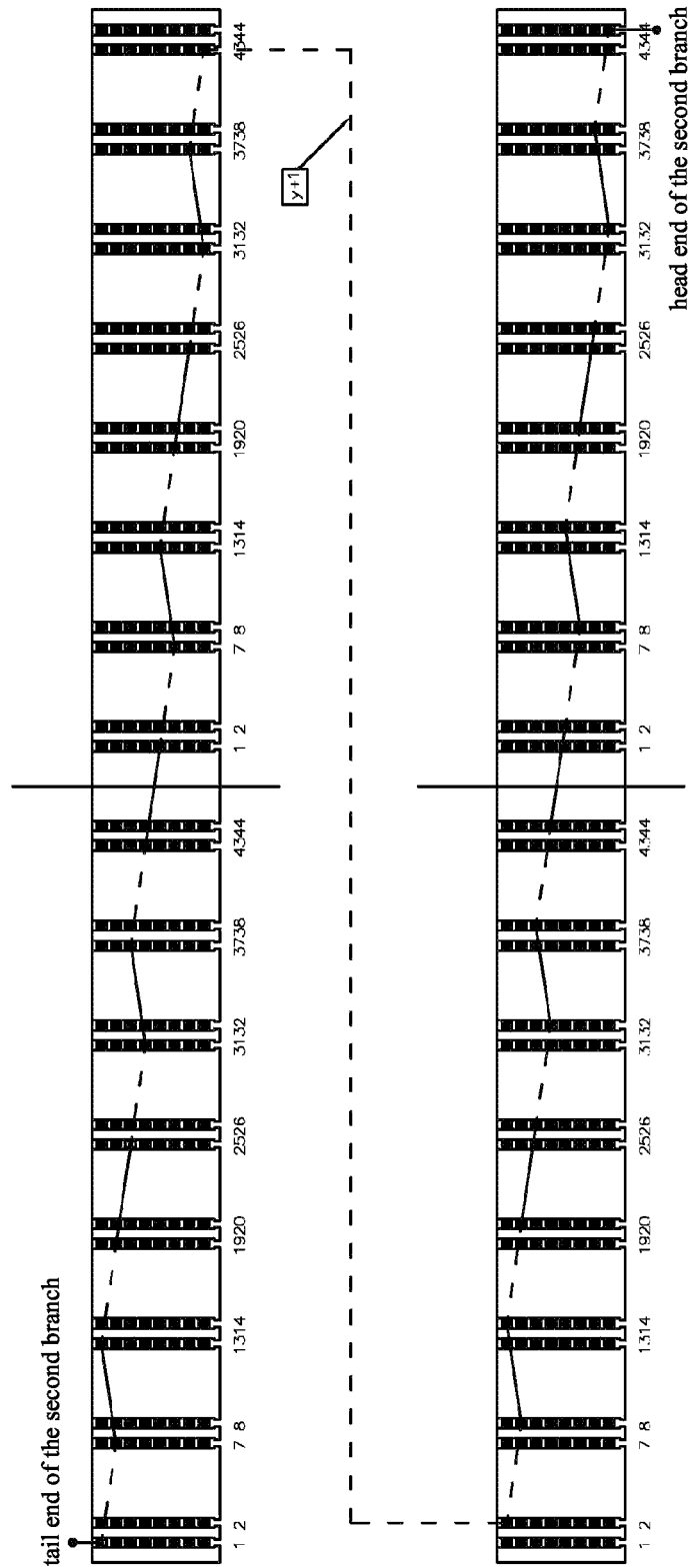
FIG. 22B illustrates the diagram of wiring expansion at the U-shaped end of the second parallel-winding branch of the U-phase winding according to Example III of the present application.
Figure 22C:
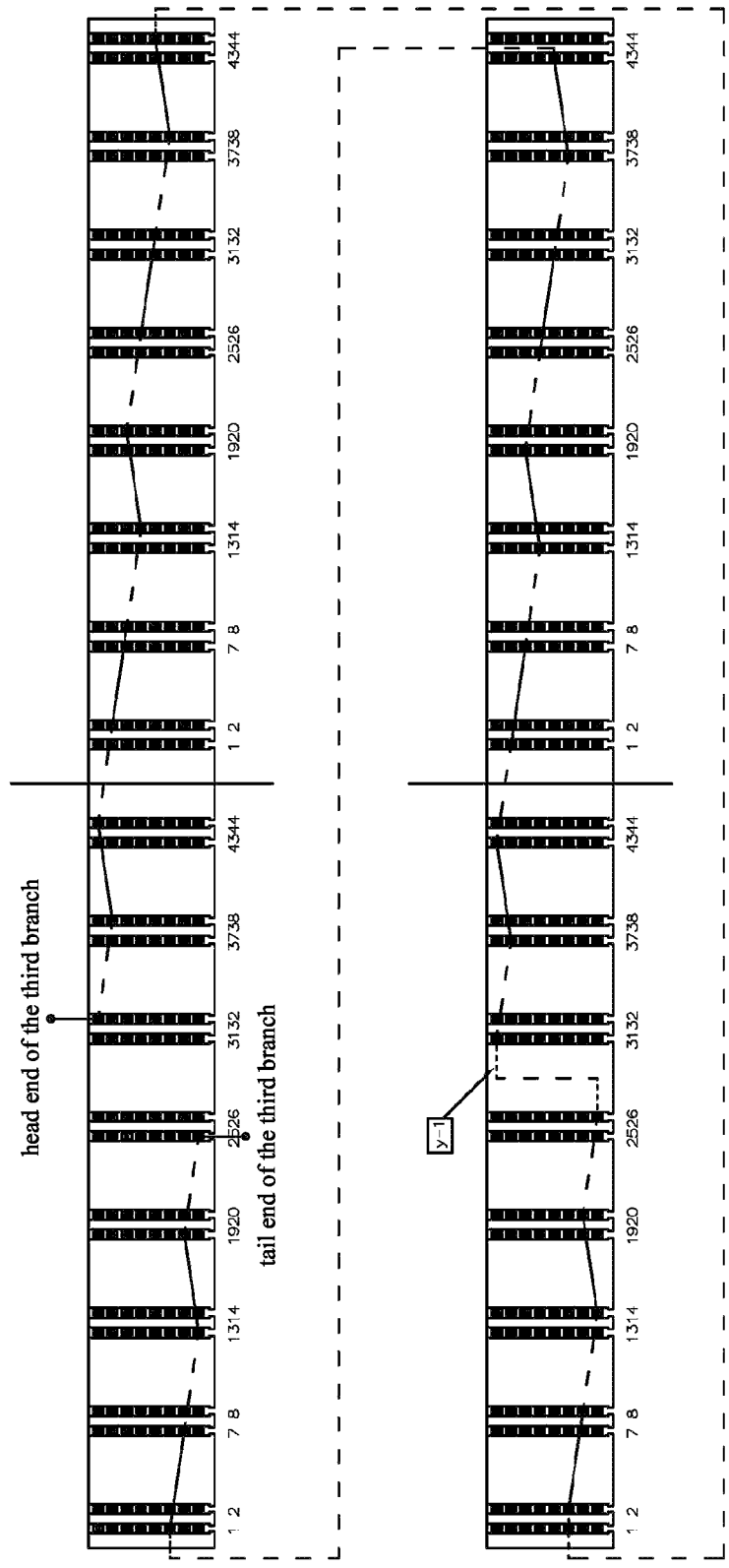
FIG. 22C illustrates the diagram of wiring expansion at the U-shaped end of the third parallel-winding branch of the U-phase winding according to Example III of the present application.
Figure 22D:
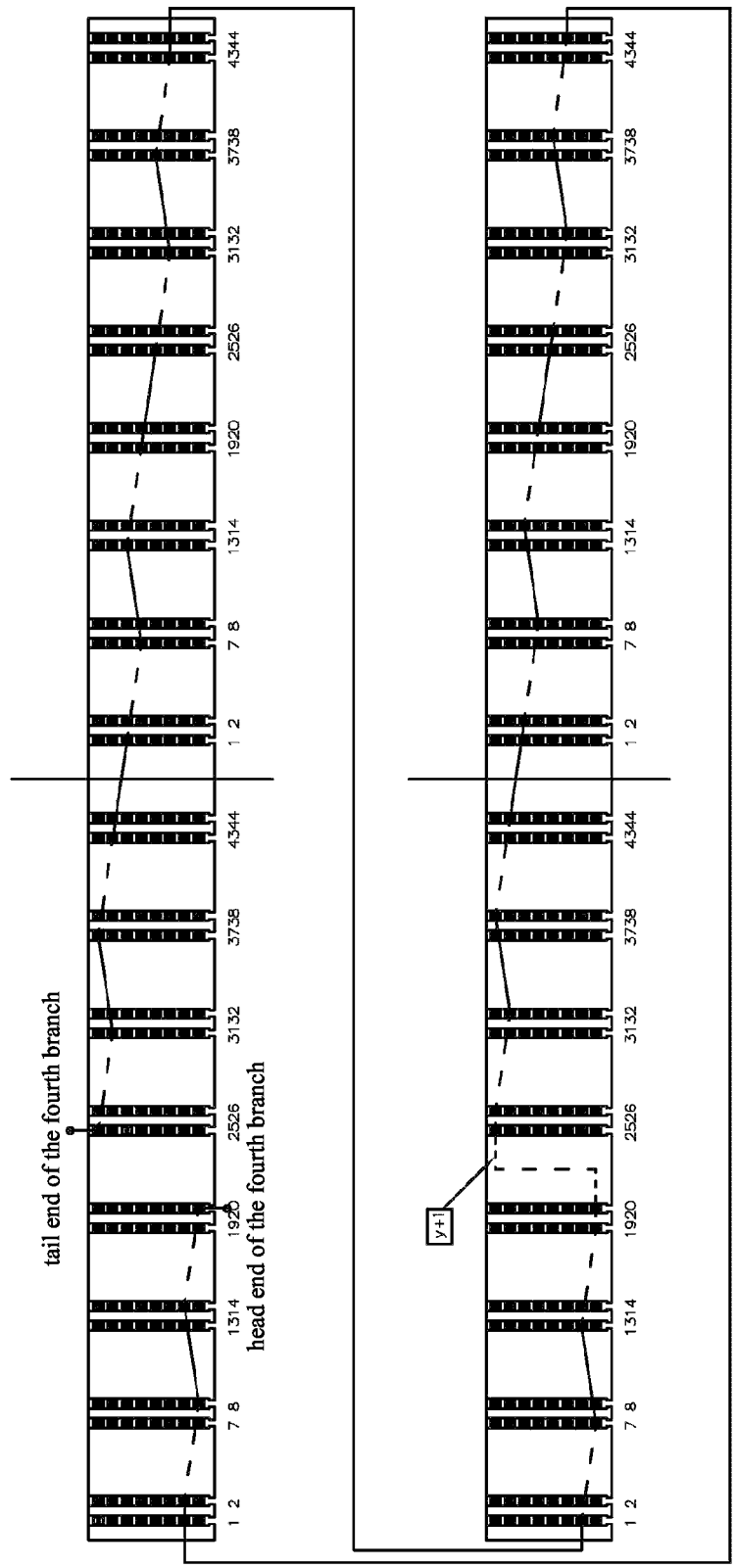
FIG. 22D illustrates the diagram of wiring expansion at the U-shaped end of the fourth parallel-winding branch of the U-phase winding according to Example III of the present application.

As shown in FIG. 21A and FIG. 22A, the first parallel-winding branch of phase U is connected as:
8.1-14.2^20.1-26.2^32.3-38.4^44.3-2.4^8.5-14.6^20.5-26.6^32.7-38.8^44.7-2.8↔7.1-13.2^19.1-25.2^31.3-37.4^43.3-1.4^7.5-13.6^19.5-25.6^31.7-37.8^43.7-1.8 (Note: "^" represents connected with connecting part, "-" represents connected by soldering, "↔" represents connected with deflector);

As shown in FIG. 21B and FIG. 22B, the second parallel-winding branch of Phase U is connected as:
44.8-38.7^32.8-26.7^20.6-14.5^8.6-2.5^44.4-38.3^32.4-26.3^20.2-14.1^8.2-2.1↔43.8-37.7^31.8-25.7^19.6-13.5^7.6-1.5^43.4-37.3^31.4-25.3^19.2-13.1^7.2-1.1 (Note: "^" represents connected with connecting part, "-" represents connected by soldering, "↔" represents connected with deflector);

As shown in FIG. 21C and FIG. 22C, the third parallel-winding branch of phase U is connected as:
32.1-38.2^44.1-2.2^8.3-14.4^20.3-26.4^32.5-38.6^44.5-2.6^8.7-14.8^20.7-26.8↔31.1-37.2^43.1-1.2^7.3-13.4^19.3-25.4^31.5-37.6^43.5-1.6^7.7-13.8^19.7-25.8 (Note: "^" represents connected with connecting part, "-" represents connected by soldering, "↔" represents connected with deflector);

As shown in FIG. 21D and FIG. 22D, the fourth parallel-winding branch of phase U is connected as:
20.8-14.7^8.8-2.7^44.6-38.5^32.6-26.5^20.4-14.3^8.4-2.3^44.2-38.1^32.2-26.1↔19.8-13.7^7.8-1.7^43.6-37.5^31.6-25.5^19.4-13.3^7.4-1.3^43.2-37.1^31.2-25.1
(Note: "^" represents connected with connecting part, "-" represents connected by soldering, "↔" represents connected with deflector).

The winding structure of Phase V and Phase W can be obtained according to the above patterns, and thus not repeated here.

It is to be understood that although this application is based on an example of Y-type winding structure, the features claimed to be protected by this application can also be applied to delta-type winding structure.

It will be understood that although the present application is exemplified by a full pitch winding structure, the features claimed to be protected by the present application can also be applied to a short pitch winding structure and a long pitch winding structure.

Although the present application is described herein with reference to specific embodiments, the scope of the present application is not limited to the details shown. Various modifications may be made to these details without departing from the basic principles of the present application.

The invention claimed is:

1. A stator winding structure for a motor, the motor being a three-phase AC motor having eight poles, comprising phases U, V and W; wherein each phase comprises four parallel-winding branches: a first parallel-winding branch, a second parallel-winding branch, a third parallel-winding branch and a fourth parallel-winding branch, each parallel-winding branch having a head end and a tail end, the winding directions of the first and third parallel-winding branches being the same, and the winding directions of the second and fourth parallel-winding branches being the same and opposite to the winding directions of the first and third parallel-winding branches, the three-phase AC motor being capable of normal operation when being energized, the stator winding structure being arranged on the stator core, the stator core comprising a plurality of slots, the stator winding comprising a plurality of U-shaped flat copper wires, wherein each U-shaped flat copper wire comprises: a first conductor, a second conductor substantially parallel to the first conductor, and a connecting part connecting the first conductor and the second conductor; wherein the connecting part of each U-shaped flat copper wire arranged in the motor is located on the same side relative to the motor, wherein Q represents the number of slots of the stator core, the slots being numbered clockwise or counterclockwise; i represents a natural number satisfying $1 \leq i \leq Q$; q represents the number of slots per pole per phase; $q=(Q/p)/3$ and $q=1, 2, 3 \ldots$ and so on; L represents the number of layers of each slot, and where L is an even number and $L=8+4*1$, where $1=0, 1, 2, 3 \ldots$, and j is a natural number satisfying $1 \leq j \leq L$, and y represents the pitch; one layer in one slot corresponding to one conductor; and wherein as seen from the side of the connecting part, two conductors of the U-shaped flat copper wire are connected as:

conductor of layer j in slot i being connected to conductor of layer j+1 in slot i+y in the case that j is odd and j+1, 3, 5 . . . L−1, conductor of layer j in slot i being connected to conductor of layer j−1 in slot i−y in the case that j is even and j=2, 4, 6 . . . L, as seen from the solder end of the motor, two conductors being soldered or joined with deflector to form a three-phase AC motor are connected as:

conductor of layer j in slot i being connected to conductor of layer j+1 or j−1 in slot i+y in the case that j=2, 4, 6 . . . L−2;

conductor of layer j in slot i being connected to conductor of layer j+1 or j−1 in slot i−y in the case that j=3, 5 . . . L−1;

conductor of layer j in slot i being connected to conductor of layer j−1 in slot i+y or to layer 1 in slot i+y+1 or i+y−1 in the case that j=L, conductor of layer j in slot i being connected to conductor of layer j+1 in slot i−y or to layer L in slot i−y+1 or i−y−1 in the case that j=1, where the value of i is a function of the phase of the winding and the branch number, and where $i-y=i-y+Q$ when $i-y<0$ and $i+y=i+y-Q$ when $i+y>Q$.

2. A stator winding structure for a motor, the motor being a three-phase AC motor having eight poles, comprising phases U, V and W; wherein each phase comprises four parallel-winding branches: a first parallel-winding branch, a second parallel-winding branch, a third parallel-winding branch and a fourth parallel-winding branch, each parallel-winding branch having a head end and a tail end, the winding directions of the first and third parallel-winding branches being the same, and the winding directions of the second and fourth parallel-winding branches being the same and both opposite to the winding directions of the first and third parallel-winding branches, the three-phase AC motor being capable of normal operation when being energized, the stator winding structure being arranged on the stator core, the stator core comprising a plurality of slots, the stator winding comprising a plurality of U-shaped flat copper wires, wherein each U-shaped flat copper wire comprises: a first conductor, a second conductor substantially parallel to the first conductor, and a connecting part connecting the first conductor and the second conductor; wherein the connecting part of each U-shaped flat copper wire arranged in the motor is located on the same side relative to the motor, wherein Q represents the number of slots of the stator core, the slots being numbered clockwise or counterclockwise; i represents a natural number satisfying $1 \leq i \leq Q$; q represents the number of slots per pole per phase; $q=(Q/p)/3$ and $q=1, 2, 3 \ldots$ and so on; L represents the number of layers of each slot, where L is an even number and $L=8+4*1$, where $1=0, 1, 2, 3 \ldots$, j is a natural number satisfying $1 \leq j \leq L$; and y represents the pitch; one layer in one slot corresponding to one conductor, as seen from the side of the solder end, two conductors being soldered together to form a three-phase AC motor with 8 poles and including four parallel-winding branches per phase are connected as:

conductor of layer j in slot i being connected to conductor of layer j+1 in slot i+y in the case that j is odd and j=1, 3, 5 . . . L−1, conductor of layer j in slot i being connected to conductor of layer j−1 in slot i−y in the case that j is even and j=2, 4, 6 . . . L, as seen from the side of the motor with the connecting part, two conductors are connected with deflector or connecting part as:

conductor of layer j in slot i being connected to conductor of layer j+1 or j−1 in slot i+y in the case that j=2, 4, 6 . . . L−2, conductor of layer j in slot i being connected to conductor of layer j+1 or j−1 in slot i−y in the case that j=3, 5 . . . L−1, conductor of layer j in slot i being connected to conductor of layer j−1 in slot i+y or to conductor of layer 1 in slot i+y+1 or i+y−1 in the case that j=L, conductor of layer j in slot i being connected to conductor of layer j+1 in slot i−y or to layer L in slot i−y+1 or i−y−1 in the case that j=1, where the value of i is a function of the phase of the winding and the branch number and where $i-y=i-y+Q$ when $i-y<0$ and $i+y=i+y-Q$ when $i+y>Q$.

3. The stator winding structure according to claim 1, wherein each of the conductors of the first parallel-winding branch and the third parallel-winding branch at head ends is located in an odd layer of slot i±2ky, respectively, where k=0, 1, 2, 3 . . . and so on;

and wherein each of the conductors of the second parallel-winding branch and the fourth parallel-winding branch at head ends is located in an even layer of stator i±2ky, where k=0, 1, 2, 3 . . . and so on.

4. The stator winding structure according to claim 1, wherein the head and tail ends of the first parallel-winding branch, the second parallel-winding branch, the third parallel-winding branch and the fourth parallel-winding branch are located in layer 1 or layer L.

5. The stator winding structure according to claim 1, wherein the head ends of two of the four parallel-winding branches are located in layer 1 and layer L of slot i respectively; and the head ends of the other two of the four parallel-winding branches are located in layer 1 and layer L of slot i+Q/2, respectively.

6. The stator winding structure according to claim 1, wherein the stator winding structure is configured as a Y-type winding structure connected in a tail-to-tail manner or a delta-type winding structure connected in a head-to-tail manner.

7. The stator winding structure according to claim 1, wherein the stator winding structure is a full pitch winding structure, a short pitch winding structure or a long pitch winding structure.

8. A motor comprising a stator winding structure according to claim 1.

9. The motor according to claim 8, wherein the motor includes 48 stator slots, each stator slot having 8 layers.

10. The motor according to claim 9, wherein phase U comprises four parallel-winding branches: a first parallel-winding branch of phase U, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i·j" denoting layer j in slot i; and wherein
the first parallel-winding branch of phase U is connected as:
1.1^2-13.1^19.2-25.3^31.4-37.3^43.4-1.5^7.6-13.5^19.6-25.7^31.8-37.7^43.8↔2.1^8.2-14.1^20.2-26.3^32.4-38.3^44.4-2.5^8.6-14.5^20.6-26.7^32.8-38.7^44.8;
the second parallel-winding branch of phase U is connected as:
1.8^43.7-37.8^31.7-25.6^19.5-13.6^7.5-1.4^43.3-37.4^31.3-25.2^19.1-13.2^7.1↔2.8^44.7-38.8^32.7-26.6^20.5-14.6^8.5-2.4^44.3-38.4^32.3-26.2^20.1-14.2^8.1;
the third parallel-winding branch of phase U is connected as:
25.1^31.2-37.1^43.2-1.3^7.4-13.3^19.4-25.5^31.6-37.5^43.6-1.7^7.8-13.7^19.8↔26.1^32.2-38.1^44.2-2.3^8.4-14.3^20.4-26.5^32.6-38.5^44.6-2.7^8.8-14.7^20.8;
the fourth parallel-winding branch of phase U is connected as:
25.8^19.7-13.8^7.7-1.6^43.5-37.6^31.5-25.4^19.3-13.4^7.3-1.2^43.1-37.2^31.1↔26.8^20.7-14.8^8.7-2.6^44.5-38.6^32.5-26.4^20.3-14.4^8.3-2.2^44.1-38.2^32.1.

11. The motor according to claim 9, wherein phase U comprises four parallel-winding branches: a first parallel-winding branch of phase U, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i·j" denoting layer j in slot i; and wherein
the first parallel-winding branch of phase U is connected as:
13.1^19.2-25.3^31.4-37.3^43.4-1.5^7.6-13.5^19.6-25.7^31.8-37.7^43.8↔2.1^8.2-14.1^20.2-26.3^32.4-38.3^44.4-2.5^8.6-14.5^20.6-26.7^32.8-38.7^44.8↔1.1^7.2;
the second parallel-winding branch of phase U is connected as:
1.8^43.7-37.8^31.7-25.6^19.5-13.6^7.5-1.4^43.3-37.4^31.3-25.2^19.1-13.2^7.1↔2.8^44.7-38.8^32.7-26.6^20.5-14.6^8.5-2.4^44.3-38.4^32.3-26.2^20.1-14.2^8.1;
the third parallel-winding branch of phase U is connected as:
13.3^19.4-25.5^31.6-37.5^43.6-1.7^7.8-13.7^19.8↔26.1^32.2-38.1^44.2-2.3^8.4-14.3^20.4-26.5^32.6-38.5^44.6-2.7^8.8-14.7^20.8↔25.1^31.2-37.1^43.2-1.3^7.4;
the fourth parallel-winding branch of phase U is connected as:
1.6^43.5-37.6^31.5-25.4^19.3-13.4^7.3-1.2^43.1-37.2^31.1↔26.8^20.7-14.8^8.7-2.6^44.5-38.6^32.5-26.4^20.3-14.4^8.3-2.2^44.1-38.2^32.1↔25.8^19.7-13.8^7.7.

12. The motor according to claim 9, wherein phase U comprises four parallel-winding branches: a first parallel-winding branch of U phase, a second parallel-winding branch of phase U, a third parallel-winding branch of phase U and a fourth parallel-winding branch of phase U; "^" representing connection with connecting part of a U-shaped flat copper wire, "-" representing connection by soldering, "↔" representing connection by deflector, and "i·j" denoting layer j in slot i; and wherein
the first parallel-winding branch of phase U is connected as:
8.1-14.2^20.1-26.2^32.3-38.4^44.3-2.4^8.5-14.6^20.5-26.6^32.7-38.8^44.7-2.8↔7.1-13.2^19.1-25.2^31.3-37.4^43.3-1.4^7.5-13.6^19.5-25.6^31.7-37.8^43.7-1.8;
the second parallel-winding branch of phase U is connected as:
44.8-38.7^32.8-26.7^20.6-14.5^8.6-2.5^44.4-38.3^32.4-26.3^20.2-14.1^8.2-2.1↔43.8-37.7^31.8-25.7^19.6-13.5^7.6-1.5^43.4-37.3^31.4-25.3^19.2-13.1^7.2-1.1;
the third parallel-winding branch of phase U is connected as:
32.1-38.2^44.1-2.2^8.3-14.4^20.3-26.4^32.5-38.6^44.5-2.6^8.7-14.8^20.7-26.8↔31.1-37.2^43.1-1.2^7.3-13.4^19.3-25.4^31.5-37.6^43.5-1.6^7.7-13.8^19.7-25.8;
the fourth parallel-winding branch of phase U is connected as:
20.8-14.7^8.8-2.7^44.6-38.5^32.6-26.5^20.4-14.3^8.4-2.3^44.2-38.1^32.2-26.1↔19.8-13.7^7.8-1.7^43.6-37.5^31.6-25.5^19.4-13.3^7.4-1.3^43.2-37.1^31.2-25.1.

13. A vehicle comprising a motor according to claim 8.

14. The stator winding structure according to claim 2, wherein each of the conductors of the first parallel-winding branch and the third parallel-winding branch at head ends is located in an odd layer of slot i+2ky, respectively, where k=0, 1, 2, 3 . . . and so on;
and wherein each of the conductors of the second parallel-winding branch and the fourth parallel-winding branch at head ends is located in an even layer of stator i+2ky, where k=0, 1, 2, 3 . . . and so on.

15. The stator winding structure according to claim 14, wherein the head and tail ends of the first parallel-winding branch, the second parallel-winding branch, the third parallel-winding branch and the fourth parallel-winding branch are located in layer 1 or layer L.

16. The stator winding structure according to claim 2, wherein the head ends of two of the four parallel-winding branches are located in layer 1 and layer L of slot i respectively; and the head ends of the other two of the four parallel-winding branches are located in layer 1 and layer L of slot i+Q/2, respectively.

17. A motor comprising a stator winding structure according to claim 14.

18. A motor comprising a stator winding structure according to claim 15.

19. A vehicle comprising a motor according to claim 17.

20. A vehicle comprising a motor according to claim 18.

* * * * *

UNITED STATES PATENT AND TRADEMARK OFFICE
CERTIFICATE OF CORRECTION

PATENT NO. : 12,176,775 B2
APPLICATION NO. : 17/778643
DATED : December 24, 2024
INVENTOR(S) : Jun Zhu et al.

It is certified that error appears in the above-identified patent and that said Letters Patent is hereby corrected as shown below:

In the Claims

Column 17, Line 25 (Claim 10, Line 12), please delete "1.17^2" and insert --1.1^7.2-- therefor.

Signed and Sealed this
Fourth Day of February, 2025

Coke Morgan Stewart
*Acting Director of the United States Patent and Trademark Office*